(12) United States Patent
Suzuki et al.

(10) Patent No.: US 11,371,627 B2
(45) Date of Patent: Jun. 28, 2022

(54) SYSTEM, METHOD, AND COMPUTER PROGRAM FOR ANALYZING OPERATION OF FLUID CONTROL DEVICE

(71) Applicant: Fujikin Incorporated, Osaka (JP)

(72) Inventors: Yuya Suzuki, Osaka (JP); Katsunori Komehana, Osaka (JP); Masahiko Ochiishi, Osaka (JP); Akihiro Harada, Osaka (JP); Ryutaro Tanno, Osaka (JP); Tsutomu Shinohara, Osaka (JP)

(73) Assignee: Fujikin Incorporated, Osaka (JP)

( * ) Notice: Subject to any disclaimer, the term of this patent is extended or adjusted under 35 U.S.C. 154(b) by 183 days.

(21) Appl. No.: 16/494,775

(22) PCT Filed: Mar. 13, 2018

(86) PCT No.: PCT/JP2018/009793
§ 371 (c)(1),
(2) Date: Sep. 17, 2019

(87) PCT Pub. No.: WO2018/168873
PCT Pub. Date: Sep. 20, 2018

(65) Prior Publication Data
US 2020/0080663 A1   Mar. 12, 2020

(30) Foreign Application Priority Data

Mar. 17, 2017  (JP) .............................. JP2017-053709

(51) Int. Cl.
*F16K 37/00* (2006.01)
*G01M 3/02* (2006.01)
(52) U.S. Cl.
CPC ........... *F16K 37/0041* (2013.01); *G01M 3/02* (2013.01)
(58) Field of Classification Search
None
See application file for complete search history.

(56) References Cited

U.S. PATENT DOCUMENTS

2007/0034264 A1* 2/2007 Kunz ................... F16K 31/042
137/554
2009/0306830 A1* 12/2009 Cummings ........ G05B 23/0283
700/282

(Continued)

FOREIGN PATENT DOCUMENTS

JP    H04-093736 A1    3/1992
JP    H05-126669 A1    5/1993

(Continued)

OTHER PUBLICATIONS

Machine translation of WO 2016132468A1 (Year: 2016).*

*Primary Examiner* — Matthew G Marini
(74) *Attorney, Agent, or Firm* — Chris Mizumoto

(57) ABSTRACT

A cause of abnormality of a fluid control device and/or data with which abnormality can be predicted can be collected to be analyzed, and abnormality can be predicted based on a result of the analysis.
A fluid control device 8 and a server 72 are configured to be able to communicate with each other through networks NW1 and 2. The fluid control device 8 includes an operation information acquisition mechanism that acquires a plurality of types of operation information about the fluid control device 8. The server 72 includes a determination processing unit 721 that determines whether the fluid control device 8 has an abnormality, an information collection unit 724 that collects the operation information and an abnormality determination result for the fluid control device 1, an information storage unit 725 that stores the operation information and the determination result collected, an information extraction unit 726 that refers to the information storage unit 725, and extracts, analysis target including same predetermined operation information and another of the operation information as well as information related to the determination result, selectively for each of a plurality of the fluid control (Continued)

devices 1, and a correlation analysis unit 727 that analyzes correlation between a predetermined operation of the fluid control device 8 and occurrence of abnormality through comparison using the information extracted.

7 Claims, 15 Drawing Sheets

(56) References Cited

U.S. PATENT DOCUMENTS

2014/0238512 A1* 8/2014 Bowers .............. F16K 37/0041
　　　　　　　　　　　　　　　　　　　137/554
2018/0294174 A1* 10/2018 Fujikata .............. G05B 19/058

FOREIGN PATENT DOCUMENTS

| | | |
|---|---|---|
| JP | 2014-021029 A1 | 2/2014 |
| JP | 2016-23928 A | 2/2016 |
| JP | 2016-513228 A | 5/2016 |
| JP | 2016-142619 A | 8/2016 |
| TW | M530401 U | 10/2016 |
| WO | WO2014130919 A1 | 8/2014 |
| WO | 2016/132468 A1 | 8/2016 |

\* cited by examiner (a)

(b)

SYSTEM, METHOD, AND COMPUTER PROGRAM FOR ANALYZING OPERATION OF FLUID CONTROL DEVICE

CROSS-REFERENCE

This application is a national phase of an international application, PCT/JP2018/009793 filed on Mar. 13, 2018, which claims the benefit of Japanese Application No. 2017-0053709 filed on Mar. 17, 2017.

TECHNICAL FIELD

The present invention relates to a fluid control device that accommodates therein a sensor and an information processing module that executes processing based on data obtained by the sensor.

BACKGROUND ART

Conventionally, film forming processing, for forming a thin film on a surface of a semiconductor wafer, has been required to achieve a finer thin film. In this context, recently, a film forming method, known as Atomic Layer Deposition (ALD), capable of forming a thin film with a thickness at an atomic level or a molecular level has been employed.

Meanwhile, due to such an attempt to achieve finer thin films, fluid control devices have been required to perform opening/closing operations more frequently than ever. The resultant load may lead to a higher risk of fluid leakage and the like. Thus, there has been an increasing demand for technology enabling the fluid leakage of the fluid control device to be easily detected.

Furthermore, a fluid control device and an information collection method have been demanded that not only enable the leakage to be detected easily, but also are capable of collecting various types of environmental factor information (such as a frequency of use, temperature, humidity, and vibration of the fluid control device that are not considered conventionally) having impact on abnormalities of the fluid control device, such as the leakage, analyzing correlation between the information and an abnormality, and utilizing a result of the analysis for estimation of an occurrence of the abnormality.

In a semiconductor manufacturing process, it is important that the leakage can be remotely detected, because highly-reactive and extremely-toxic gas is used in the process.

For implementation of the ALD, a piping connection distance between the fluid control device and a process chamber is important. Specifically, it is important for the fluid control device to be further downsized and arranged very close to a process chamber, so that the process can be controlled at an even high speed.

In this context, Patent Document 1 proposes a seal portion damage detection mechanism including: a hole formed on an outer surface of a controller for controlling the flow rate of a fluid; and a leak detection member attached to the hole. The hole communicates with a gap inside the controller. The leak detection member comprises a cylindrical body attached to the hole and a movable member provided in the cylindrical body. The movable member is movable to the outside of the cylindrical body due to pressure of a leaked fluid filling the gap in the controller.

Further, Patent Document 2 proposes a controller with a seal portion damage detection mechanism including a hole formed on an outer surface of the controller for controlling the flow rate of a fluid and a leak detection member attached to the hole. The hole communicates with a gap in the controller, and the leak detection member reacts to the presence of a certain fluid.

Furthermore, Patent Document 3 proposes a leak detection device that detects fluid leakage including: a sensor holding body; an ultrasonic sensor that is held by the sensor holding body to face a leak port provided to a leakage detection target member so that a sealed portion in the leakage detection target member communicates with the outside; an ultrasonic path provided between a sensor surface of the ultrasonic sensor and the leak port; and a processing circuit that processes ultrasonic waves obtained by the ultrasonic sensor.

CITATION LIST

Patent Literature

Patent Literature 1: JP 04-093736 A
Patent Literature 2: JP 05-126669 A
Patent Literature 3: JP 2014-21029 A

SUMMARY OF INVENTION

Technical Problem

Any of the devices described in Patent Documents 1, 2, and 3 is implemented with the mechanism for detecting abnormality attached to the outer side of the fluid control device. In a fluid control apparatus in which a plurality of fluid control devices are integrated, the fluid control devices are densely arranged to achieve a compact configuration, and thus it is not preferable to provide a member or the like for detecting abnormality on the outer side of the fluid control device.

In addition, when wiring connecting the members for detecting an abnormality of the fluid control device to each other is exposed to the outside, the twisting or short circuiting of the wiring may occur. This may lead to a failure in the fluid control device itself.

The movable member required to accurately operate is incorporated in the fluid control device. Thus, when a member for detecting abnormality of the fluid control device and the like are incorporated, such member has to be prevented from interfering with the operation of the movable member. In addition, to incorporate the member for detecting abnormality of the fluid control device and the like, the fluid control device needs to have a large size. Such a resultant large size of the fluid control apparatus is not preferable.

Furthermore, even when a structure in which the member for detecting abnormality in the fluid control device and the like are incorporated is employed, an abnormality detection result is preferably checkable easily from the outside of the fluid control device.

Furthermore, in any of the above-mentioned devices, sensor data changes only after the occurrence of abnormality, and thus the failure of the abnormality cannot be predicted.

In view of this, one object of the present invention is to provide a fluid control device that can have a small size, while incorporating a member for detecting abnormality of the fluid control device. Another object of the present invention is to enable a result of determining an abnormality of the fluid control device to be easily checkable from the outside.

Solution to Problem

In order to achieve the above object(s), an operation analysis system for a fluid control device according to the present invention is an operation analysis system for a fluid control device, in which the fluid control device and an information processing apparatus that executes data mining based on information acquired from the fluid control device are configured to be able to communicate with each other through a network, the fluid control device includes an operation information acquisition mechanism that acquires a plurality of types of operation information about the fluid control device, and the information processing apparatus includes an abnormality determination unit that determines whether the fluid control device has an abnormality, an information collection unit that collects the operation information and an abnormality determination result for the fluid control device, an information storage unit that stores the operation information and the determination result collected, an information extraction unit that refers to the information storage unit, and extracts analysis target including same predetermined operation information and another of the operation information as well as information related to the determination result, selectively for each of a plurality of the fluid control devices, and a correlation analysis unit that analyzes correlation between a predetermined operation of the fluid control device and occurrence of abnormality through comparison using the information extracted.

The fluid control device may be provided with a flow path and a space isolated from the flow path by an isolation member, the fluid control device may include a pressure sensor that detects pressure in the space isolated from the flow path by the isolation member, the pressure sensor serving as the operation information acquisition mechanism, and the abnormality determination unit may compare a detected value detected by the pressure sensor with a predetermined threshold, to determine whether the fluid control device has an abnormality.

The operation information acquisition mechanism may acquire, as operation information, all of or any two or more of number of opening/closing times, operation time, environment temperature, environment humidity, and driving pressure of the fluid control device, as well as internal stress acting on a component of the fluid control device.

The information processing apparatus may further include an abnormality prediction unit that, based on an analysis result obtained by the correlation analysis unit, refers to the operation information about the fluid control device stored in the information storage unit, and calculates an abnormality occurrence probability of the fluid control device, to predict occurrence of abnormality of the fluid control device.

The information extracted may be the operation information and information related to the determination result within a predetermined period of time before and after an open/close state of the fluid control device is switched.

The abnormality prediction unit may include a first abnormality prediction unit that determines whether the operation information includes a specific characteristic in a failure preceding period, by means of supervised learning, and a second abnormality prediction unit that determines whether the operation information indicates a normal operation state, by means of an autoencoder that has learned the operation information during a normal operation.

An operation analysis system for a fluid control device according to another aspect of the present invention is an operation analysis system for a fluid control device, in which the fluid control device and an information processing apparatus that executes data mining based on information acquired from the fluid control device are configured to be able to communicate with each other through a network, the fluid control device includes an operation information acquisition mechanism that acquires a plurality of types of operation information about the fluid control device, and an abnormality determination unit that determines whether the fluid control device has an abnormality, and the information processing apparatus includes an information collection unit that collects the operation information and an abnormality determination result for the fluid control device, an information storage unit that stores the operation information and the determination result collected, an information extraction unit that refers to the information storage unit, and extracts analysis target including same predetermined operation information and another of the operation information as well as information related to the determination result, selectively for each of a plurality of the fluid control devices, and a correlation analysis unit that analyzes correlation between a predetermined operation of the fluid control device and occurrence of abnormality through comparison using the information extracted.

An operation analysis method for a fluid control device according to another aspect of the present invention is an operation analysis method for a fluid control device, in which in a system in which the fluid control device that includes an operation information acquisition mechanism that acquires a plurality of types of operation information about the fluid control device and an information processing apparatus that executes data mining based on information acquired from the fluid control device are configured to be able to communicate with each other through a network, the information processing apparatus executes a process of determining whether the fluid control device has an abnormality, a process of collecting the operation information and an abnormality determination result for the fluid control device, a process of storing the operation information and the determination result collected in an information storage unit, a process of referring to the information storage unit, and extracting, analysis target including same predetermined operation information and another of the operation information as well as information related to the determination result, selectively for each of a plurality of the fluid control devices, and a process of analyzing correlation between a predetermined operation of the fluid control device and occurrence of abnormality through comparison using the information extracted.

A computer program according to another aspect of the present invention is a computer program for operation analysis for a fluid control device, in which in a system in which the fluid control device that includes an operation information acquisition mechanism that acquires a plurality of types of operation information about the fluid control device and an information processing apparatus that executes data mining based on information acquired from the fluid control device are configured to be able to communicate with each other through a network. The computer program causes the information processing apparatus to execute a process of determining whether the fluid control device has an abnormality, a process of collecting the operation information and an abnormality determination result for the fluid control device, a process of storing the operation information and the determination result collected in an information storage unit, a process of referring to the information storage unit, and extracting an analysis target including same predetermined operation information and another of the operation information as well as information related to the determination result, selectively for each of a plurality of the fluid control devices, and a process of analyzing correlation between a predetermined operation of the fluid control device and occurrence of abnormality through comparison using the information extracted.

The computer program can be provided by being downloaded via a network such as the Internet, or can be provided by being recorded on various types of readable recording media.

Advantageous Effects of Invention

According to the present invention, the fluid control device can be downsized, while the member for detecting abnormality of the fluid control device is incorporated in the fluid control device. Furthermore, a result of detecting an abnormality of the fluid control device can be easily checked from the outside. Furthermore, a cause of abnormality and/or data with which abnormality can be predicted can be collected to be analyzed. Furthermore, abnormality can be predicted based on a result of the analysis, and prediction can be compared with the actual result to improve the prediction accuracy. Furthermore, only a dynamic sensor measurement value during a valve operation can be used for the learning, whereby the dimensional quantity of the learning can be reduced to reduce a calculation cost, without compromising the accuracy.

DESCRIPTION OF EMBODIMENTS

First Embodiment

Figure 1:
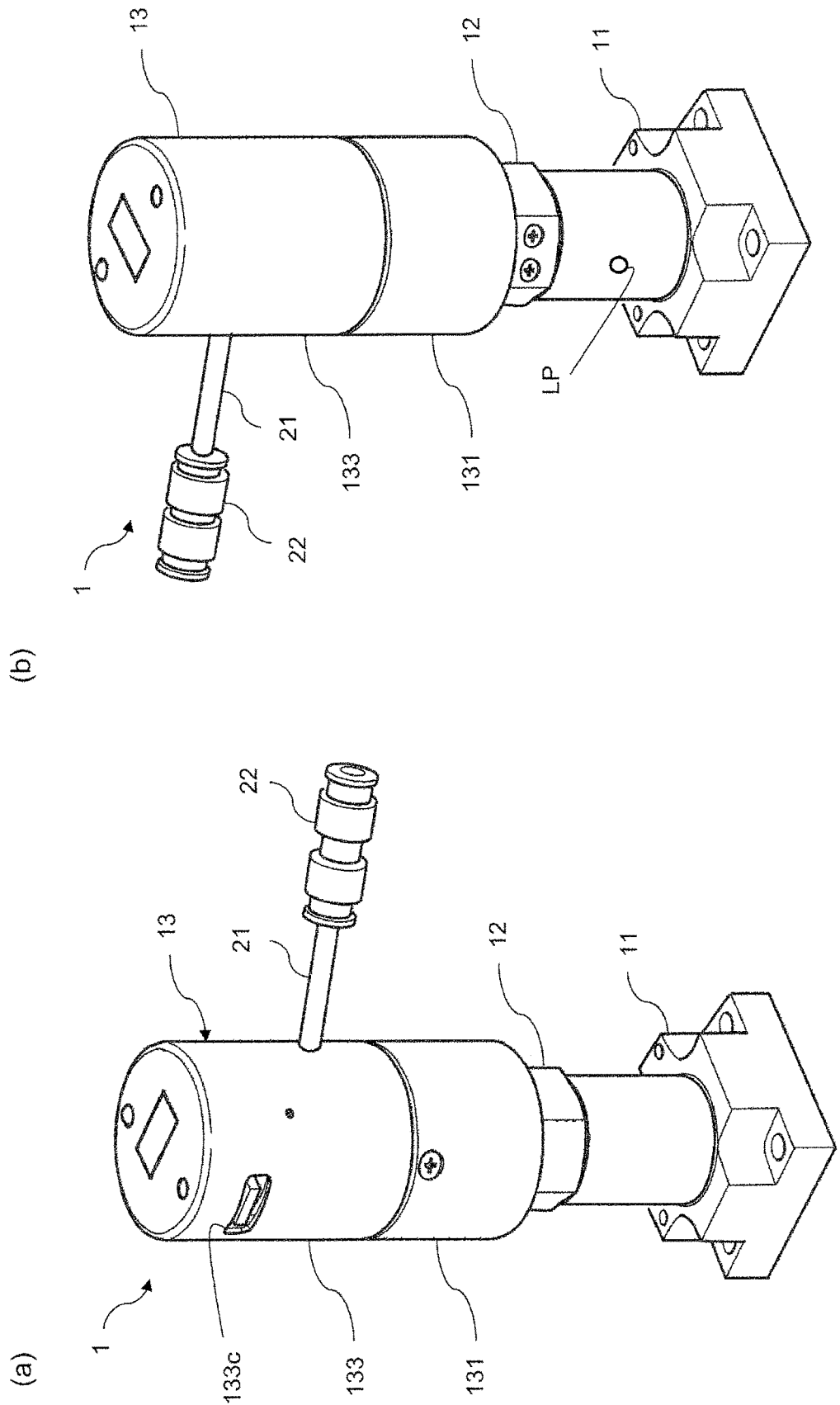
FIG. 1 is an external perspective view of a fluid control device according to an embodiment of the present invention, and includes (a) that is a view from a front side and (b) that is a view from a back side.

A fluid control device according to a first embodiment of the present invention will be described below with reference to the drawings.

In the following description, the directions of members and the like may be referred to as upper, lower, left, and right depending on the directions in the drawings for the sake of convenience, but these do not limit the directions of members or the like in the actual situation or an embodiment of the present invention.

As illustrated in FIG. 1, a fluid control device 1 according to the present embodiment incorporates a sensor for detecting an abnormality of the fluid control device 1, in particular, leakage of fluid, a module involved in driving the sensor, and the like, and has an upper side provided with a panel that displays an operation status and an extraction port for extracting information related to the operation status.

Figure 2:
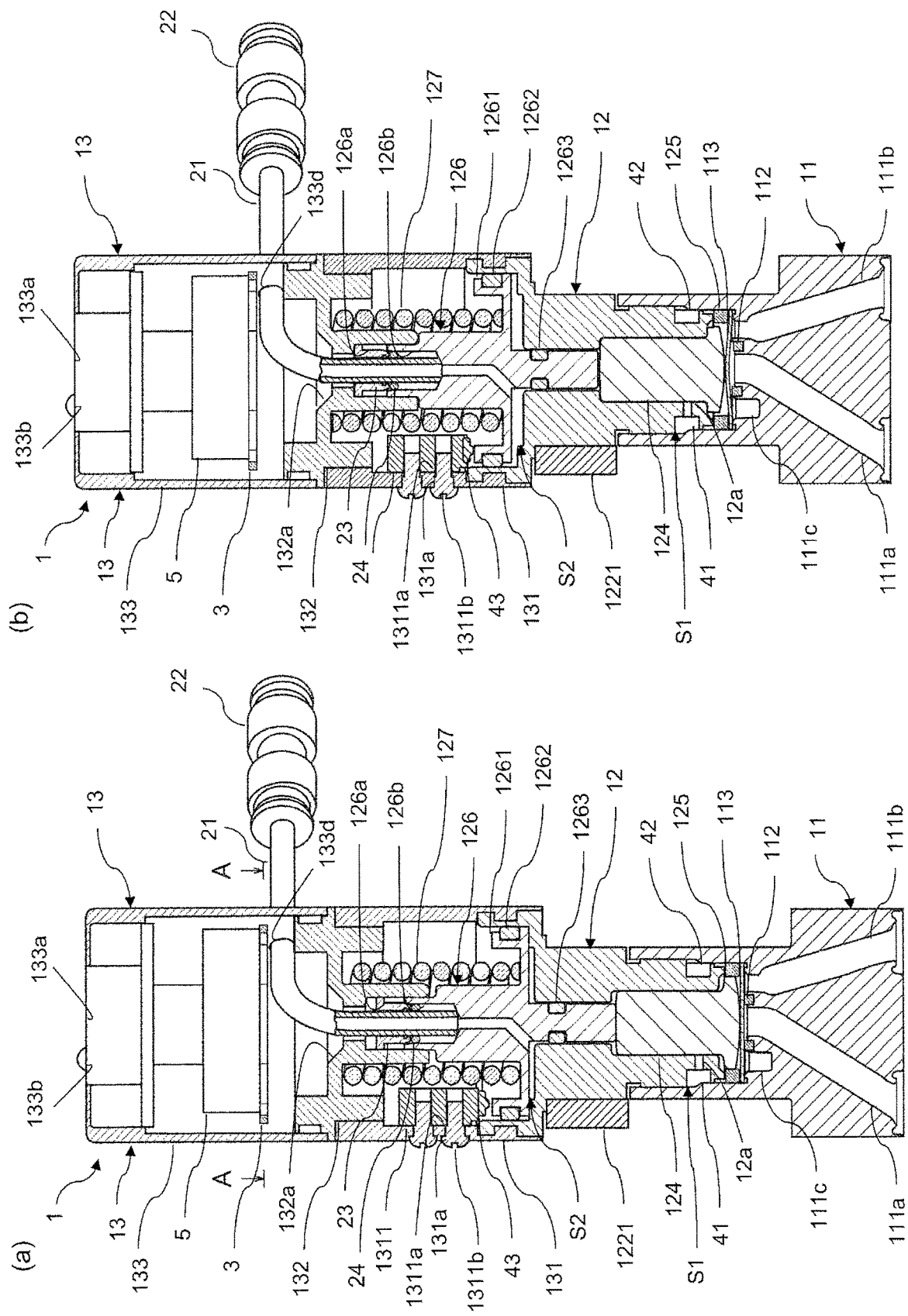
FIG. 2 is a partial perspective view of the fluid control device according to the present embodiment, and includes (a) illustrating a valve closed state, and (b) illustrating a valve open state.

As illustrated in FIG. 2, the fluid control device 1 according to the present embodiment includes a valve body 11, a substantially cylindrical actuator body 12 provided at the upper end of the valve body 11, and a casing 13 provided at the upper end of the actuator body 12.

In the valve body 11, an inflow path 111a through which a fluid flows in, an outflow path 111b through which the fluid flows out, and a valve chamber 111c that communicates with the inflow path 111a and the outflow path 111b are provided. The inflow path 111a, the outflow path 111b, and the valve chamber 111c integrally form a flow path 111 through which the fluid flows.

Furthermore, an annular seat 112 is provided on a circumference of a portion where the inflow path 111a and the valve chamber 111c communicate with each other. Furthermore, on the seat 112, a diaphragm 113 is provided which causes the fluid to flow from the inflow path 111a to the outflow path 111b and blocks the flow by being brought into contact with and separated from the seat 112.

The diaphragm 113 is a disk-shaped member made of metal such as stainless steel or a NiCo-based alloy and/or a fluorine-based resin, and functions as an isolation member that isolates the flow path 111 and a space S1 from each other. Upon being released from pressure from a disk 124 due to air serving as driving pressure supplied, the diaphragm 113 has a center portion displaced in a direction away from the seat 112 due to restoration force thereof or pressure in the flow path 111, to be separated from the seat 112. As a result, the valve chamber 111c is opened, whereby the inflow path 111a and the outflow path 111b communicate with each other.

On the other hand, upon being pressed toward the disk 124 with the supply of the air serving as the driving pressure terminated, the diaphragm 113 has the center portion displaced in a direction to be in contact with the seat 112, to be in contact with the seat 112. As a result, the valve chamber 111c is closed, and a flow between the inflow path 111a and the outflow path 111b is blocked.

As illustrated in FIG. 1(b), the valve body 11 has a side surface provided with a leak port LP configured as a through hole through which the space S1 and the outside communicate with each other. The leak port LP may be closed when a pressure sensor 41 described later detects the pressure in the space S1 to detect an abnormality in the fluid control device 1. When the leak port LP is closed, the space S1 is in an airtight state.

The leak port LP also functions as a test port when airtightness of the flow path 111 is inspected in finished product inspection for the fluid control device 1. This finished product inspection is performed with inert helium gas (He) or the like circulated in the flow path 111.

Generally, a bellows is used as the isolation member in addition to the diaphragm 113 according to this example. However, the bellows can achieve a large stroke (flow rate range) but involves a large change in an internal volume of the actuator body, requiring a breathing port (corresponding to the leak port LP in this example) to be opened during an opening/closing operation of the fluid control device.

On the other hand, a change in the internal volume the actuator body 12 is small with the direct diaphragm structure as in the present example, that is, a structure in which the fluid flows from the inflow path 111a to the outflow path 111b or the fluid flow is blocked with the diaphragm 113 brought into contact with or separated from the seat 112. Thus, the fluid control device 1 can perform the opening/closing operation without problem, even when the leak port LP is closed for detecting the pressure change with the pressure sensor 41 described later attached in the actuator body 12 for detecting an abnormality of the fluid control device 1.

Figure 3:
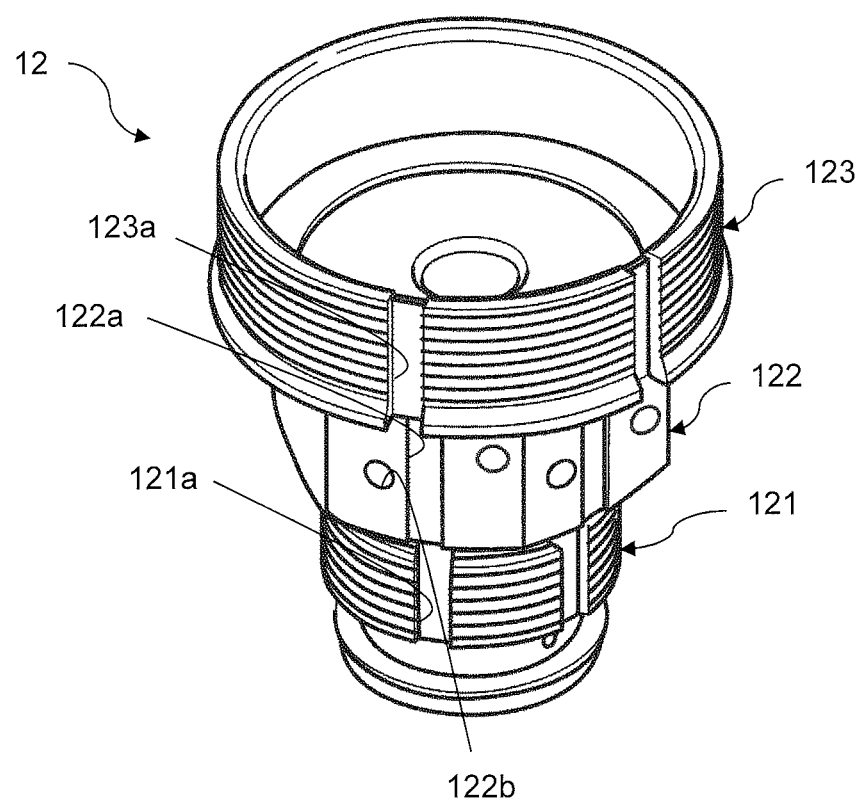
FIG. 3 is an external perspective view of an actuator body of the fluid control device according to the present embodiment.

As illustrated in FIG. 3, the actuator body 12 includes a screw portion 121 screwed to the valve body 11, an exposed portion 122 exposed to the outside, and a screw portion 123 screwed to a cap body 131 of the casing 13.

The screw portion 121 has a threaded outer circumference surface to be screwed with a threaded inner circumference surface of the valve body 11.

Furthermore, the screw portion 123 also has a threaded outer circumference surface to be screwed with the inner circumference surface of the cap body 131.

Wiring grooves 121a, 122a, and 123a, through which wiring can be provided, are formed on the outer circumference surface of the actuator body 12 along an axial direction. The wiring grooves 121a and 123a provided on the outer circumference surfaces of the screw portions 121 and 123 have groove bottoms at positions deeper than the grooves of the screws formed on the outer circumference surfaces. Thus, the screw portions 121 and 123 can be screwed with the valve body 11 and the cap body 131, respectively, without causing breaking or the like of the wiring provided through the wiring grooves 121a and 123a.

Screw holes 122b for attaching the cover 1221 are provided on both sides of the wiring grooves 122a provided on the outer circumference surface of the exposed portion 122.

Figure 4:
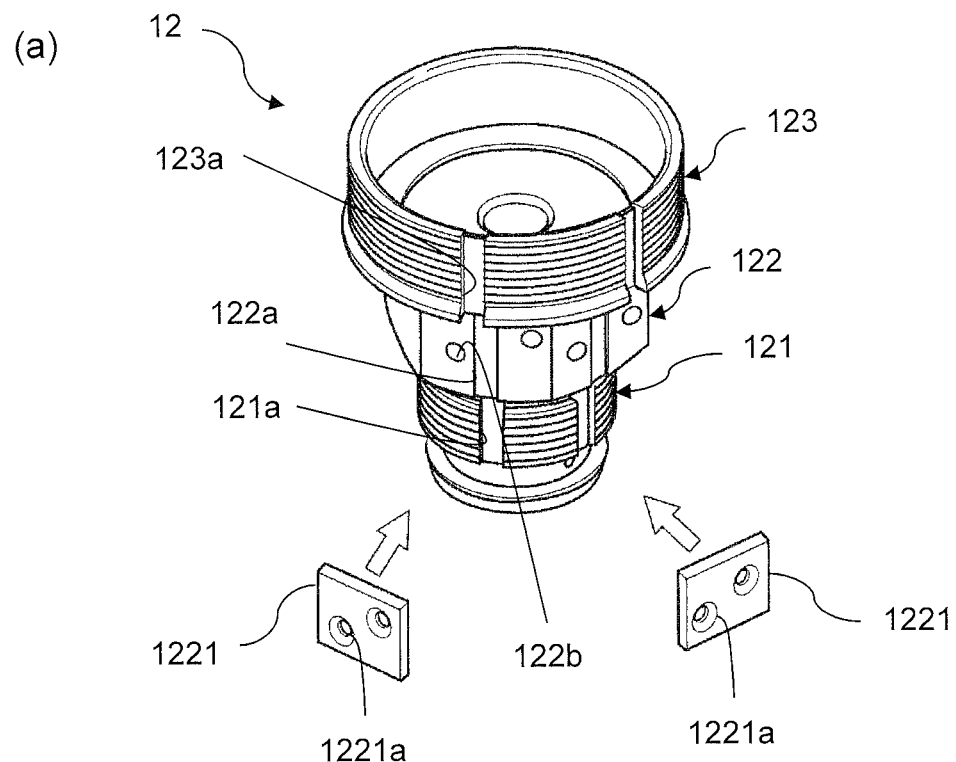
FIG. 4 is a diagram illustrating a process of attaching a cover to the actuator body of the fluid control device according to the present embodiment, and includes (a) illustrating a state before the attachment and (b) illustrating a state after the attachment.
Figure 4:
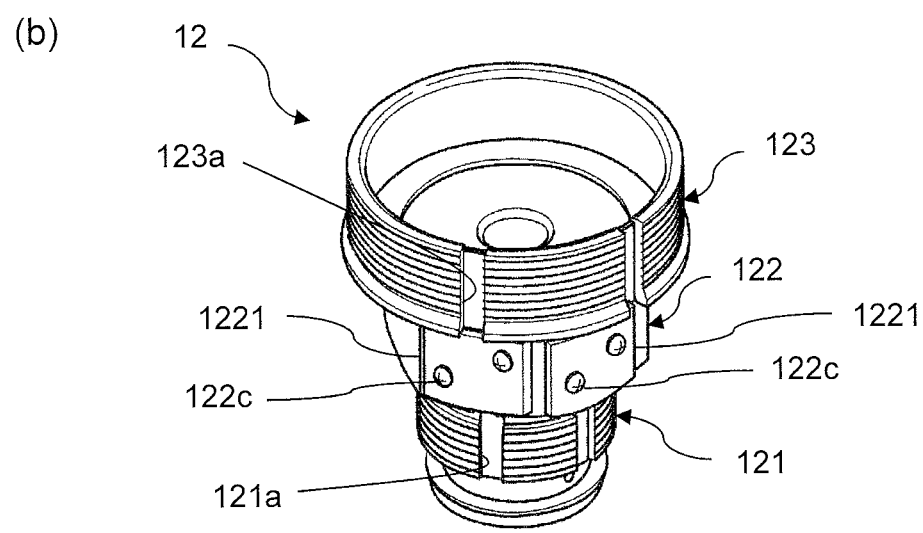

As illustrated in FIG. 4, covers 1221 that are member that covers the wiring grooves 122a are each provided with a through hole 1221a corresponding to the screw hole 122b of the actuator body 12. The wiring provided through the wiring groove 122a of the actuator body 12 is covered with the cover 1221, with a screw 122c screwed into the screw hole 122b of the actuator body 12 through the through hole 1221a of the cover 1221.

The actuator body 12 incorporates the disk 124 for pressing the diaphragm 113, a pressing adapter 125 for pressing the circumference edge of the diaphragm 113, a piston 126 that slides up and down, and a spring 127 that is wound on the outer circumference surface of the piston 126 and biases the piston 126 downward.

The pressing adapter 125 presses the circumference edge of the diaphragm 113 from above, to prevent the fluid flowing in the flow path 111 from leaking into the actuator body 12 from a portion around a circumference edge portion of the diaphragm 113.

The piston 126 causes the diaphragm 113 to be in contact with and separated from the seat 112 via the disk 124.

A substantially central portion of the piston 126 in the axial direction expands to be in a disk shape, so that this portion serves as an increased diameter portion 1261. The piston 126 receives the biasing force of the spring 127, on the upper surface side of the increased diameter portion 1261. Furthermore, a driving pressure introduction chamber S2 is formed between the upper end surface of the actuator body 12 and a lower end side of the increased diameter portion 1261.

Furthermore, in the piston 126, a driving pressure introduction path 126b is formed through which an opening 126a formed on the upper end surface and the driving pressure introduction chamber S2 formed on the lower end side of the increased diameter portion 1261 communicate with each other.

An introduction pipe 21 for introducing a driving pressure from the outside is connected to the opening 126a of the piston 126.

A holding member with a small diameter is provided on the outer circumference surface of the increased diameter portion 1261 of the piston 126, and holds an O ring 1262. The O ring 1262 seals between the outer circumference surface of the piston 126 and the inner circumference surface of the actuator body 12.

Furthermore, a holding member having a small diameter is also provided on the lower end side of the piston 126, and holds an O ring 1263. The O ring 1263 seals between the outer circumference surface of the piston 126 and the inner circumference surface of the actuator body 12. Thus, a space S1 partitioned by the diaphragm 113 and the O ring 1263 is formed at a portion where the disk 124 in the actuator body 12 moves up and down.

Here, a through hole 12a is formed in the screw portion 121 of the actuator body 12. The through hole 12a enables the space S1 to communicate with the outside through the leak port LP provided in the valve body 11. When the leak port LP is closed, the space S1 is isolated from the outside to be in the airtight state.

A space formed by the O ring 1262 and the O ring 1263 forms the driving pressure introduction chamber S2 communicating with the driving pressure introduction path 126b in the piston 126.

Air is introduced into the driving pressure introduction chamber S2 from the introduction pipe 21 through the driving pressure introduction path 126b in the piston 126. When the air is introduced into the driving pressure introduction chamber S2, the piston 126 is pushed upward against the biasing force of the spring 127. As a result, the diaphragm 113 is separated from the seat 112 so that a valve open state is achieved, whereby the fluid flows.

On the other hand, when the introduction of the air into the driving pressure introduction chamber S2 is terminated, the piston 126 is pushed downward due to the biasing force of the spring 127. As a result, the diaphragm 113 comes into contact with the seat 112 so that a valve closed state is achieved, whereby the flow of the fluid is blocked.

The casing 13 is a substantially cylindrical member with one end closed, is disposed on the upper end of the actuator body 12, incorporates an information processing module 5 that processes data obtained by a pressure sensor 41, a temperature sensor 42, and a limit switch 43, and performs the other like operation.

The casing 13 according to the present example includes three members that are the cap body 131, an actuator cap 132, and a cap top 133.

The cap body 131 is a substantially cylindrical member, and is disposed on the upper end of the actuator body 12. The outer circumference surface of an upper end portion of the actuator body 12 and the inner circumference surface of a lower end portion of the cap body 131 are threaded in a corresponding manner. Thus, the cap body 131 is fixed on the actuator body 12 with these surfaces screwed with each other.

A fixing member 1311 is attached to the inner circumference surface of the cap body 131.

The fixing member 1311 is a member for fixing the limit switch 43 described later, and has a substantially rectangular parallelepiped shape. The fixing member 1311 is provided with a screw hole 1311a for attaching the fixing member 1311 to the inner circumference surface of the cap body 131.

The cap body 131 is provided with a through hole 131a corresponding to this. The fixing member 1311 is fixed with a screw 1311b inserted through the through hole 131a of the cap body 131 from the outside and screwed to the screw hole 1311a of the fixing member 1311 provided on the inner circumference surface of the cap body 131.

Figure 5:
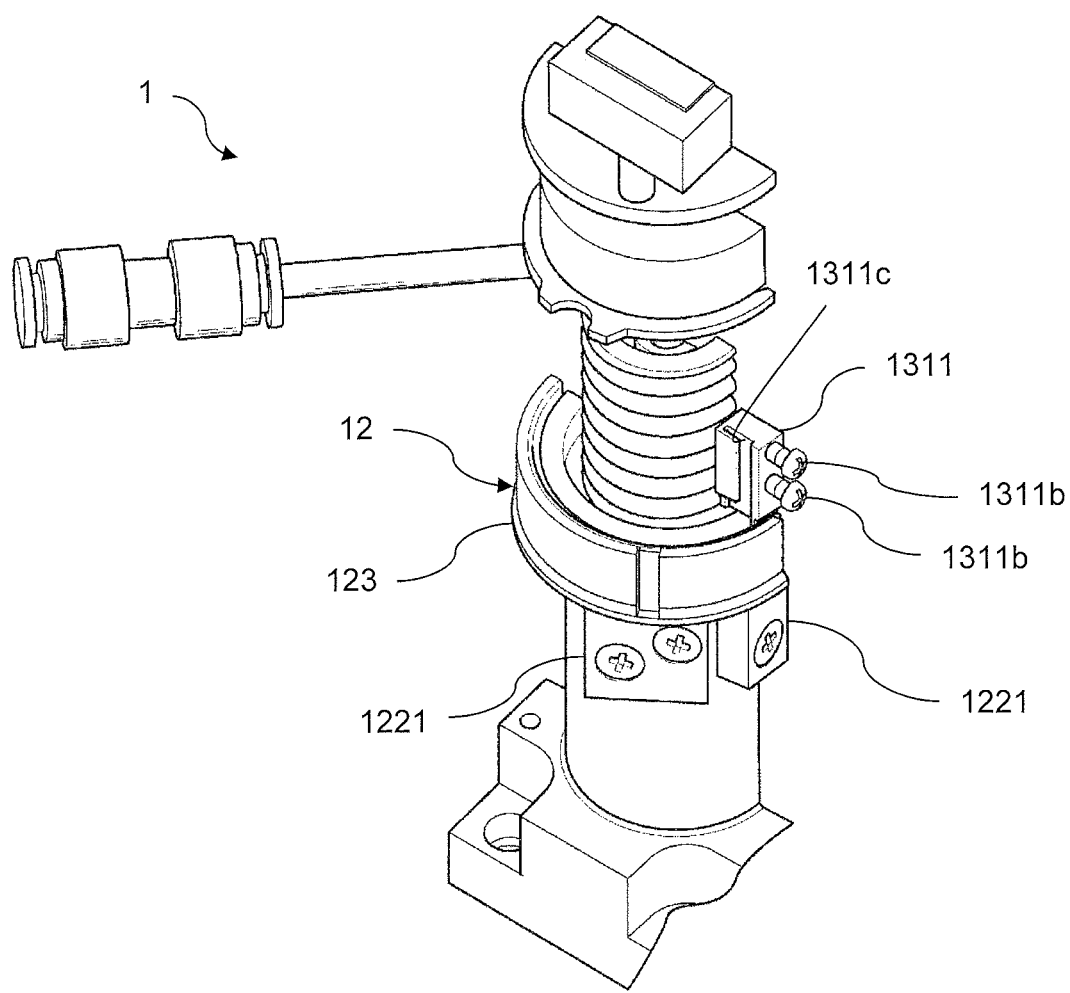
FIG. 5 is a partially enlarged view illustrating a fixing member attached to the fluid control device according to the present embodiment.

As illustrated in FIG. 5, the fixing member 1311 is provided with a wiring groove 1311c through which wiring, leading from the limit switch 43 described later, is provided. Thus, the wiring groove 1311c can receive the wiring.

The actuator cap 132 is a substantially disk-shaped member disposed on the upper end of the cap body 131, and divides the casing 13 into upper and lower parts.

The spring 127 is sandwiched between the lower end side of the actuator cap 132 and the upper surface of the increased diameter portion 1261 of the piston 126.

Furthermore, a substantially cylindrical through hole 132a, extending toward the piston 126, is provided at a position corresponding to the opening 126a of the piston 126, which is at the center of the actuator cap 132. One end of the introduction pipe 21 is inserted into the through hole 132a.

Figure 6:
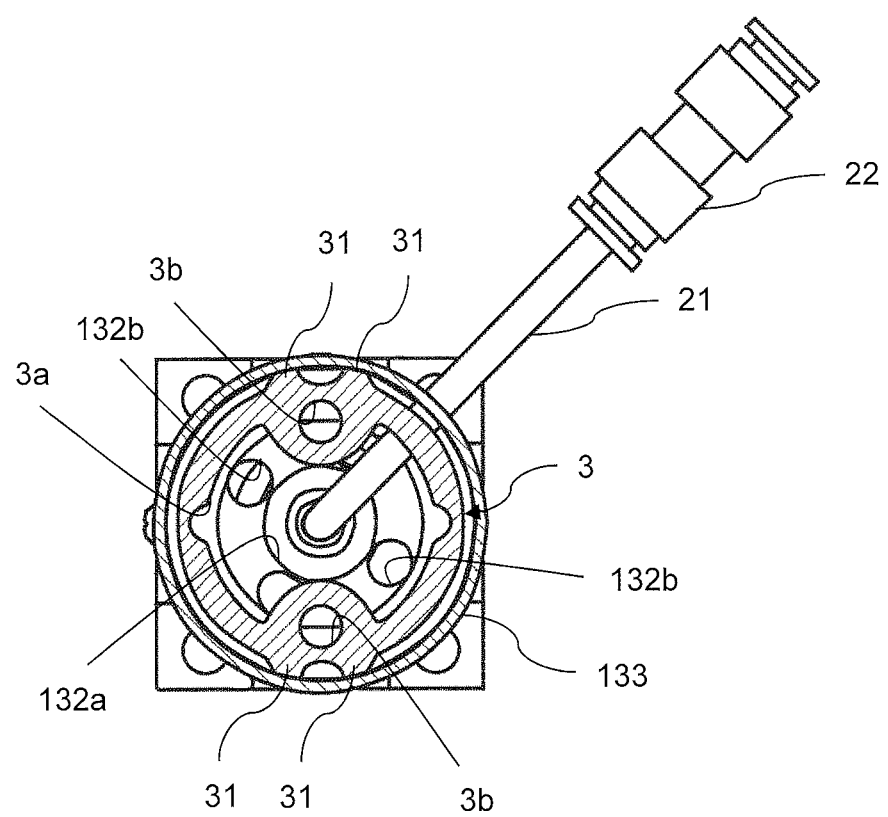
FIG. 6 is a diagram illustrating the fluid control device according to the present embodiment taken along a line indicated by arrows A-A.

Furthermore, as illustrated in FIG. 6, through holes 132b through which wiring is provided are provided on the outer side of the through hole 132a.

The cap top 133 is a substantially cap-shaped member disposed on the upper end of the actuator cap 132, and can has a hollow internal portion that can accommodate the information processing module 5.

The cap top 133 has an upper surface provided with through holes 133a and 133b.

A liquid crystal panel or the like for displaying data acquired by the pressure sensor 41, the temperature sensor 42, and the limit switch 43, a result of the processing based on the data, and the like is fitted to the through hole 133a.

A warning lamp such as a light emitting diode (LED) lamp is fitted in the through hole 133b. When the result of the processing based on the data acquired by the pressure sensor 41, the temperature sensor 42, and the limit switch 43 indicates that an abnormality has occurred in the fluid control device 1, the warning lamp is used for issuing a notification indicating the abnormality.

As illustrated in FIG. 1, the cap top 133 has a side surface provided with a through hole 133c. The through hole 133c is provided with a connector for connecting to an external device for extraction of the data acquired by the temperature sensor 42 and the limit switch 43, the result of the processing based on the data, and the like A through hole 133d is provided in a portion, of the side surface of the cap top 133, near the opening on the actuator cap 132 side while being separated from the upper surface of the cap top 133. The introduction pipe 21 is inserted into the through hole 133d.

The introduction pipe 21 is a pipe for introducing the air serving as the driving pressure from the outside into the fluid control device 1, and is made of a nylon tube or the like to have flexibility.

The introduction pipe 21 has one end inserted into the driving pressure introduction path 126b from the opening 126a of the piston 126. An O ring 24 is held between the outer circumference surface of the distal end of the introduction pipe 21 inserted into the driving pressure introduction path 126b and the inner circumference surface of the driving pressure introduction path 126b. The O ring 24 seals between the inner circumference surface of the driving pressure introduction path 126b and the outer circumference surface of the introduction pipe 21 inserted into the driving pressure introduction path 126b. Thus, the air introduced from the introduction pipe 21 is introduced into the driving pressure introduction chamber S2 through the driving pressure introduction path 126b in the piston 126, without leaking.

Furthermore, the fixing member 23 for fixing the introduction pipe 21 is fitted to the through hole 132a of the actuator cap 132. The fixing member 23 is a substantially cylindrical member and has a through hole having an inner diameter that is substantially the same as the outer diameter of the introduction pipe 21. The introduction pipe 21 is inserted through this through hole. Furthermore, the fixing member 23 has a circumference edge, on the side of the opening 126a, protruding to be in a claw shape, whereby the introduction pipe 21 inserted into the fixing member 23 is fixed so as not to be pulled out.

The other end of the introduction pipe 21, whose one end is inserted into the driving pressure introduction path 126b from the opening 126a of the piston 126, is drawn out from the through hole 133d of the cap top 133. A one-touch fitting 22 is attached to the distal end of the other end.

A holding member 3 is held in the vicinity of the opening on the side of the actuator cap 132 of the cap top 133.

As illustrated in FIG. 6, the holding member 3 is a substantially ring-shaped flexible member made of resin, and supports the information processing module 5 upward from the lower surface side so that the information processing module 5 is held within the cap top 133.

Through holes 3a and 3b are formed through the holding member 3 in a vertical direction. Wiring, connecting the pressure sensor 41, the temperature sensor 42, and the limit switch 43 to the information processing module 5, can be provided through the through holes 3a and 3b.

Figure 7:
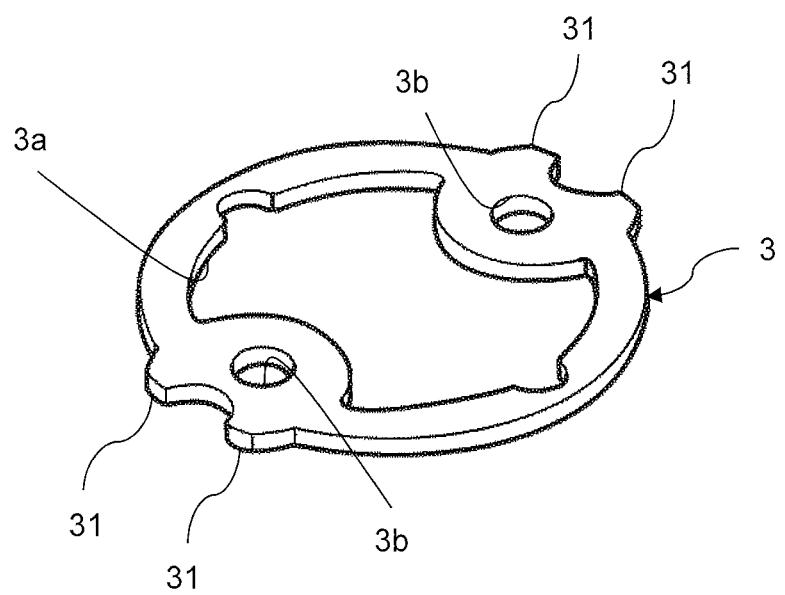
FIG. 7 is an external perspective view illustrating a holding member attached to the fluid control device according to the present embodiment.

The holding member 3 has an outer circumference edge provided with a protrusion 31 formed to be in a claw shape protruding outward. An outer diameter of the holding member 3 including the protrusion 31 is substantially equal to or slightly larger than the inner diameter of the hollow portion of the cap top 133. Thus, as illustrated in FIG. 7, when the holding member 3 is attached to the inner circumference surface of the cap top 133, the holding member 3 is held on the inner circumference surface of the cap top 133 by the protrusion 31 in a strutting manner.

Furthermore, the holding member 3 is held at a position that is in the vicinity of the opening on the side of the actuator cap 132 of the cap top 133 and above the position where the through hole 133d is provided.

Thus, the information processing module 5 is held on the holding member 3 so that the introduction pipe 21 is not crushed by the information processing module 5.

In the present embodiment, the diameter of the through hole 3a is large, and the holding member 3 is formed to have a substantially ring shape, so that the holding member 3 can be easily bent and easily attached to the inner circumference surface of the cap top 133.

On the other hand, in another embodiment, the holding member 3 may have a substantially disk shape and be provided with only a small hole through which the wiring is routed. Furthermore, the holding member 3 can be a member integrally formed with the cap top 133. When the holding member 3 is integrally formed with the cap top 133, the entire top surface of the cap top 133 may be openable/closable so that the information processing module can be provided to the inside portion from the top surface.

In the fluid control device 1, the pressure sensor 41, the temperature sensor 42, and the limit switch 43 are attached to predetermined locations, and the information processing module 5 that processes data detected by the pressure sensor 41, the temperature sensor 42, and the limit switch 43 is accommodated.

In the space S1, the pressure sensor 41 for detecting the pressure in the space S1 and the temperature sensor 42 for measuring the temperature of the fluid are attached.

The pressure sensor 41 includes a pressure-sensitive element that detects a pressure change in the space S1, a conversion element that converts a detected value of the pressure detected by the pressure-sensitive element into an electrical signal, and the like.

In this embodiment, a pressure change in the space S1 is detected by the pressure sensor 41 so that an abnormality in the fluid control device 1 due to fluid leakage or the like is detected. Note that a capacitor microphone unit can be used as the pressure sensor 41. Specifically, the capacitor microphone unit has a diaphragm that vibrates upon receiving a sound wave, and a counter electrode disposed opposite to the diaphragm, and can obtain a sound signal as a result of converting a change in a static capacity between the diaphragm and the counter electrode into a voltage change. This capacitor microphone unit becomes nondirectional (omnidirectional) once the air chamber provided on the back side of the diaphragm is closed. The capacitor microphone unit in this nondirectional state operates to capture a change in sound pressure due to sound waves in any directions, and thus can be used as the pressure sensor 41.

The temperature sensor 42 measures the temperature at the installed location. The installed location is near the flow path 111, and thus the temperature at the installation location can be regarded as the temperature of the fluid flowing in the flow path 111.

The limit switch 43 is attached inside the cap body 131 of the casing 13.

The limit switch 43 is fixed in the cap body 131 by the fixing member 1311 attached to the inner circumference surface of the cap body 131.

The limit switch 43 is fixed above the increased diameter portion 1261 of the piston 126, and the switch is switched according to the vertical movement of the piston 126. That is, when the piston 126 is pushed upward at the time of valve opening, the limit switch 43 is pressed by the increased diameter portion 1261 of the piston 126. On the other hand, when the piston 126 is pressed downward at the time of valve closing, the limit switch 43 is released from the state of being pressing by the increased diameter portion 1261 of the piston 126.

Based on the pressing of the limit switch 43 due to the vertical movement of the piston 126, the number of opening/closing times and the frequency of opening/closing of the fluid control device 1 can be detected. Furthermore, when a plurality of the limit switches 43 are provided, the opening/closing speed of the fluid control device 1 can be detected.

Now, how the wiring connecting the pressure sensor 41, the temperature sensor 42, and the limit switch 43 to the information processing module 5 is routed will be described with reference to FIG. 8 and FIG. 9.

First of all, the wiring leading from the pressure sensor 41 and the temperature sensor 42 is drawn into the cap body 131 through the wiring grooves 121a, 122a, and 123a formed on the outer circumference surface of the actuator body 12.

The wiring grooves 121a, 122a, and 123a are covered by the valve body 11, the cover 1221, and the cap body 131, respectively, and thus the wiring routed from the pressure sensor 41 and the temperature sensor 42 into the cap body 131 will not be exposed to the outside.

Further, the wiring leading from the limit switch 43 is fitted into the wiring groove 1311c of the fixing member 1311 illustrated in FIG. 5 and is also drawn into the cap body 131.

The wiring of the pressure sensor 41, the temperature sensor 42, and the limit switch 43 drawn into the cap body 131 is routed into the cap top 133 through the through hole 132b provided in the actuator cap 132, to be connected to the information processing module 5.

As described above, in the fluid control device 1, the wiring is routed without being exposed to the outside or coming into contact with a movable member such as the piston 126 in the fluid control device 1, and thus can be prevented from breaking or the like by coming into contact with another device and the like.

The information processing module 5 includes a Large-Scale Integration (LSI) that processes the data detected by the pressure sensor 41, the temperature sensor 42, and the limit switch 43. The information processing module 5 may include a driving power source and the like, such as a coin battery, supplying power required for driving the pressure sensor 41, the temperature sensor 42, and the limit switch 43.

Figure 10:
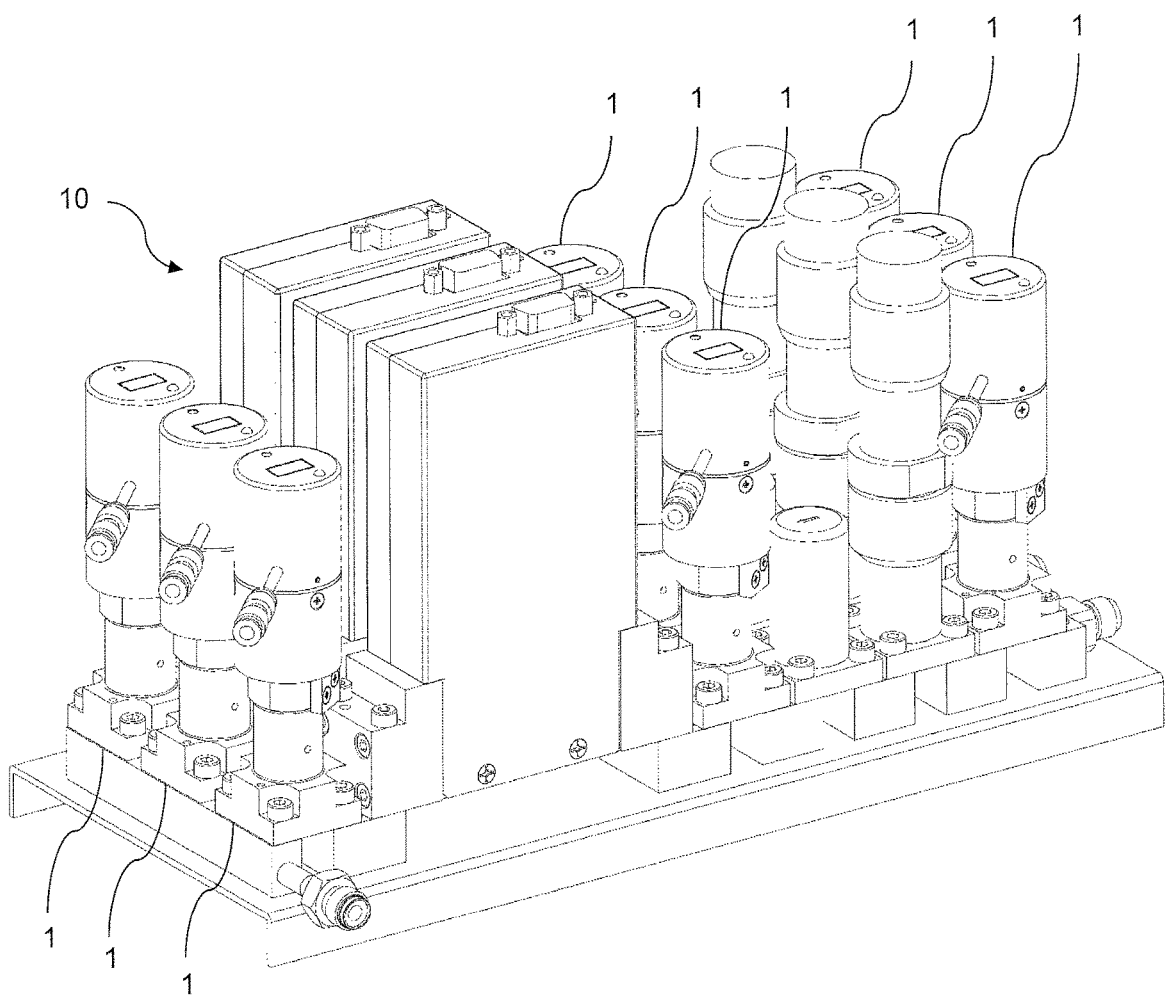
FIG. 10 is an external perspective view illustrating a fluid control apparatus including the fluid control device according to the present embodiment.

As illustrated in FIG. 10, a plurality of the fluid control devices 1 having the above configuration are generally integrated to form a fluid control apparatus 10.

In the fluid control apparatus 10 thus including the plurality of fluid control devices 1, the fluid control devices 1 are densely arranged. Thus, the panel that displays data about each fluid control apparatus 10 and the port for connecting to an external device such as a USB memory so that information can be extracted from the information processing module 5 are preferably provided on the upper surface or at least on the upper side of the information processing module 5. In particular, the panel for displaying data is difficult to view unless viewed from the top.

Next, a description is given on processing, executed in the fluid control device 1 according to the present embodiment, for determining whether the fluid control device 1 has an abnormality based on data acquired by the pressure sensor 41, the temperature sensor 42, and the limit switch 43 that are attached inside.

Figure 11:
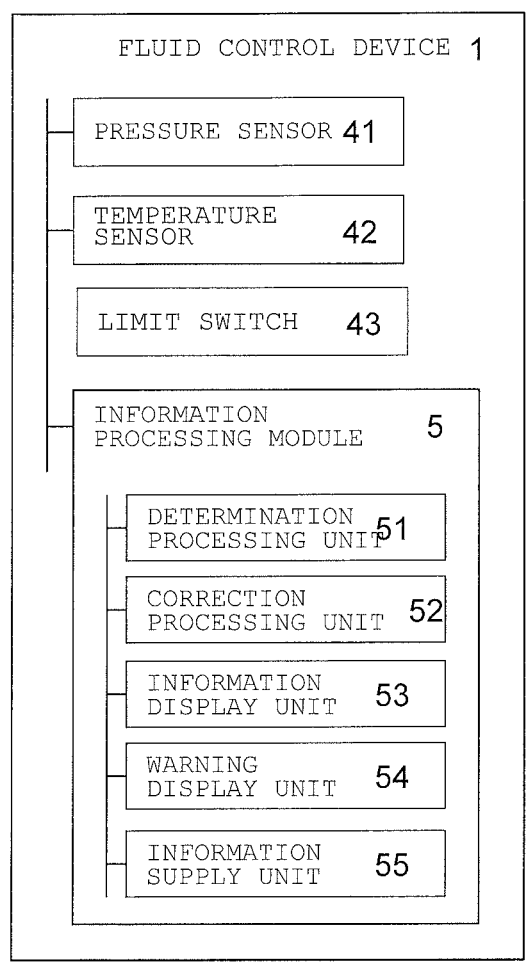
FIG. 11 is a functional block diagram illustrating functions of the fluid control device according to the present embodiment.

As illustrated in FIG. 11, the information processing module 5 according to the present embodiment includes a determination processing unit 51, a correction processing unit 52, an information display unit 53, a warning display unit 54, and an information supply unit 55.

The determination processing unit 51 is a functional unit that executes processing of determining whether the fluid control device 1 has an abnormality or not based on data acquired by the pressure sensor 41, the temperature sensor 42, and the limit switch 43.

The determination processing unit 51 can execute the processing of determining whether the fluid control device 1 has an abnormality or not due to leakage of the fluid into the space S1 and the like, by comparing a predetermined threshold, held in a reference table or the like, with a detected value of the pressure detected by the pressure sensor 41. Specifically, the predetermined threshold is set to be a limit value of the pressure in the space S1 anticipated with opening/closing of the valve in the fluid control device 1 during the normal use. The fluid control device 1 is determined to have an abnormality when the detected value of the pressure in the space S1 exceeds the threshold. The appropriateness of the determination is backed by the fact that the detected value of the pressure in the space S1 exceeding the threshold can be regarded as a result of the pressure rise in the space S1 caused by leakage of the fluid into the space S1 due to breaking of the diaphragm 113 or the like or as a result of pressure drop in the space S1 caused by pressure drop in the flow path 111.

The correction processing unit 52 corrects the predetermined threshold, referred to by the determination processing unit 51 to determine whether the fluid has leaked into the space S1, based on the temperature of the fluid measured by the temperature sensor 42.

When the correction processing unit 52 thus corrects the predetermined threshold, the determination processing unit 51 executes the processing of determining whether the fluid control device 1 has an abnormality or not due to leakage of the fluid into the space S1 and the like, by comparing the corrected threshold with a detected value of the pressure detected by the pressure sensor 41.

The information display unit 53 is a functional unit that displays information to be viewable to the outside. The information includes information related to the pressure in the space S1, the temperature of the fluid, the open/close state of the fluid control device 1, and the number of opening/closing times acquired by the pressure sensor 41, the temperature sensor 42, and the limit switch 43, as well as information related to the result of the determination processing executed by the determination processing unit 51. The information display unit 53 is implemented by a liquid crystal panel or the like, and is fitted to the through hole 133a of the cap top 133.

Thus, the condition of the fluid control device 1 can be easily recognized from the outside. In particular, in the fluid control apparatus 10 in which the fluid control devices 1 are accumulated, the information display unit 53 is disposed on the upper surface side where the fluid control devices 1 can be most easily identified, making it easier to check the information displayed.

The warning display unit 54 is a functional unit that emits light in response to the result of the determination processing, executed by the determination processing unit 51, indicating that the fluid control device 1 has an abnormality. The warning display unit 54 is implemented by a light emitter such as an LED and is fitted to the through hole 133b of the cap top 133.

Thus, with the warning display unit 54 issuing a warning when an abnormality occurs in the fluid control device 1, the abnormality can be easily recognized.

The information supply unit 55 is a functional unit for supplying, to the outside, data acquired by the pressure sensor 41, the temperature sensor 42, and the limit switch 43, and the information related to the result of the determination by the determination processing unit 51. This functional unit is used while being connected to an external computer a USB cable, and a USB connector therefor is used for performing cable insertion and removal through the through hole 133c on the side surface of the cap top 133.

According to the fluid control device 1 having the above configuration, an abnormality of the fluid control device 1 caused by the leakage of fluid into the space S1 and the like can be detected based on the comparison between the pressure in the space S1 detected by the pressure sensor 41 and the predetermined threshold.

With the fluid control device 1 detecting the pressure in the space S1, and detecting an abnormality of the fluid control device 1 by comparing the predetermined threshold value with the detected value, an abnormality involving internal pressure of the closed space S being negative pressure can also be detected.

Furthermore, when the pressure in the space S1 changes due to temperature change of the fluid, abnormality of the fluid control device 1 can be detected with this pressure change distinguished from the change in the pressure in the space S1 due to the abnormality of the fluid control device 1 such as the leakage of the fluid.

In this example, the abnormality of the fluid control device 1 is detected by detecting the pressure in the space S1 partitioned by the diaphragm 113 and the O ring 1262. Note that the space S1 may be any space defined by the diaphragm 113 in the fluid control device 1, so that by detecting the pressure in the space S1, an abnormality of the fluid control device 1 such as breakage of the diaphragm 113 and the like can be detected.

The present embodiment may be modified in the following manner. Specifically, opening and closing of the fluid control device 1 may be detected with a driving pressure sensor that detects the driving pressure of the fluid control device 1 provided instead of the limit switch that detects the opening and closing of the fluid control device 1.

In this case, while the opening and closing operation of the fluid control device 1 is in progress, determination can be made on a pressure change in the space S1 caused by the fluid leakage or the like. Thus, an appropriate transfer function for converting driving pressure into a required correction value may be obtained through experiments, to correct transient pressure change in the space S1 while the piston 126 is moving.

On the other hand, it can be determined that the piston 126 or the pressure sensor 41 is failed, if the detected value obtained by the pressure sensor 41 does not rise despite the detected value of the driving pressure sensor indicating a scenario where the pressure in the space S1 is supposed to rise.

In the above-described example, the panel for displaying information is fitted to the through hole 133a on the upper surface of the cap top 133. Additionally, the through hole 133a can be provided with an information extraction port such as a USB connector.

The fluid control device according to the present embodiment detects an abnormality of the fluid control device 1 using the determination processing unit 51 and the correction processing unit 52 included in the information processing module 5 incorporated in the fluid control device, and provides information indicating the abnormality to the outside using the information display unit 53, the warning display unit 54 or the information supply unit 55. Alternatively, the device may be configured to provide the information to a server that is configured to be capable of communicating with the fluid control device through a network.

Figure 12:
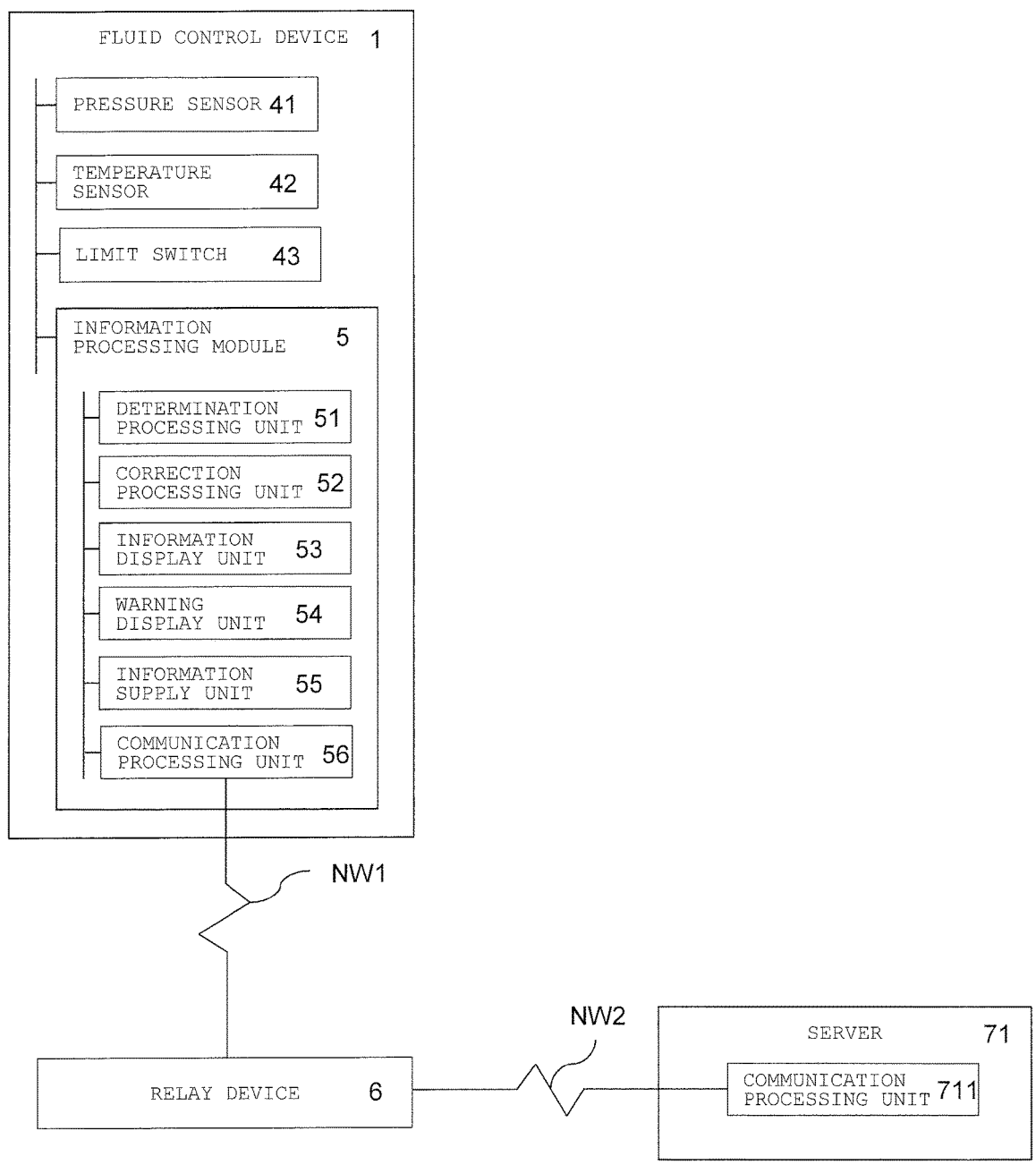
FIG. 12 is a functional block diagram illustrating functions of the fluid control device according to the present embodiment and a server configured to be able to communicate with the fluid control device.

FIG. 12 illustrates an example in which the fluid control device 1 and a server 71 can communicate with each other through networks NW1 and NW2.

In this example, the information processing module 5 includes a communication processing unit 56 so that the fluid control device 1 can transmit and receive data to and from the server 71. The communication processing unit 56 transmits the determination result obtained by the determination processing unit 51 to the server 71, and transmits data acquired by the pressure sensor 41, the temperature sensor 42, and the limit switch 43 if necessary. In this example, the relay device 6 is provided between the fluid control device 1 and the server 71, and the information from the fluid control device 1 is provided to the server 71 via the relay device 6.

Specifically, the data transmitted by the communication processing unit 56 is temporally transmitted to the relay device 6 via the network NW1 implemented by wireless communications such as Bluetooth (registered trademark), infrared communication, or Zigbee (registered trademark), for example. Then, the data is transmitted from the relay device 6 to the server 71 via the network NW2 implemented by a wireless or wired local area network (LAN) or the like.

The communication processing unit 56 can transmit the determination result obtained by the determination processing unit 51 at a predetermined interval appropriately set, such as one hour or one day. With the information thus transmitted at a predetermined interval, power consumption can be reduced.

Furthermore, as illustrated in FIG. 10, when the plurality of the fluid control devices 1 are integrated to form the fluid control apparatus 10, the communication processing unit 56 of the information processing module 5 of each fluid control device 1 can transmit the determination result obtained by the determination processing unit 51, together with self identification information with which the server 71 can identify the fluid control device 1, at a timing different among the fluid control devices 1.

With the self identification information enabling the fluid control devices 1 to be individually identified transmitted to the server 71, which one of the plurality of fluid control devices forming the fluid control apparatus 10 has an abnormality can be determined.

Furthermore, with the determination result is transmitted to the server 71 at a timing different among the fluid control devices 1, a problem of packet collision can be avoided, and temporally processing overload is less likely to occur compared with a case that the results are transmitted at once. Furthermore, unlike in the case that the results are transmitted at once, different wireless channels, used for data transmission, need not to be prepared for the respective fluid control devices 1. Thus, a large number of channels need not to be prepared. In particular, in a configuration where the network NW1 is implemented by Bluetooth (registered trademark), the number of devices that can be simultaneously connected is limited (usually seven). Thus, in such a configuration, the transmission timing may be varied to enable the use of the fluid control devices 1 exceeding the number of devices that can be simultaneously connected.

The server 71 includes hardware resources including: a Central Processing Unit (CPU); a computer program executed by the CPU; a Random Access Memory (RAM) and a Read Only Memory (ROM) that stores the computer program and predetermined data; and an external storage device such as a hard disk drive.

The server 71 includes a communication processing unit 711 for receiving the determination result, for fluid leakage in the space S1 of the fluid control device 1, via the relay device 6. The information received by the server from the fluid control device 1 is appropriately provided to a terminal used by the supervisor or the like of the fluid control device 1, in response to a request from the terminal used by the supervisor.

The relay device 6 receives data from the fluid control device 1 via the network NW1 and transmits the received data to the server 71 via the network NW2.

In the present embodiment, the relay device 6 is interposed between the fluid control device 1 and the server 71. Alternatively, the fluid control device 1 and the server 71 can be configured to be capable of directly performing data communications.

With the above configuration, the information related to the abnormality of the fluid control device 1 is collected in the server 71, so that the supervisor of the fluid control device 1 can easily monitor the operation status of the fluid control device 1.

Figure 13:
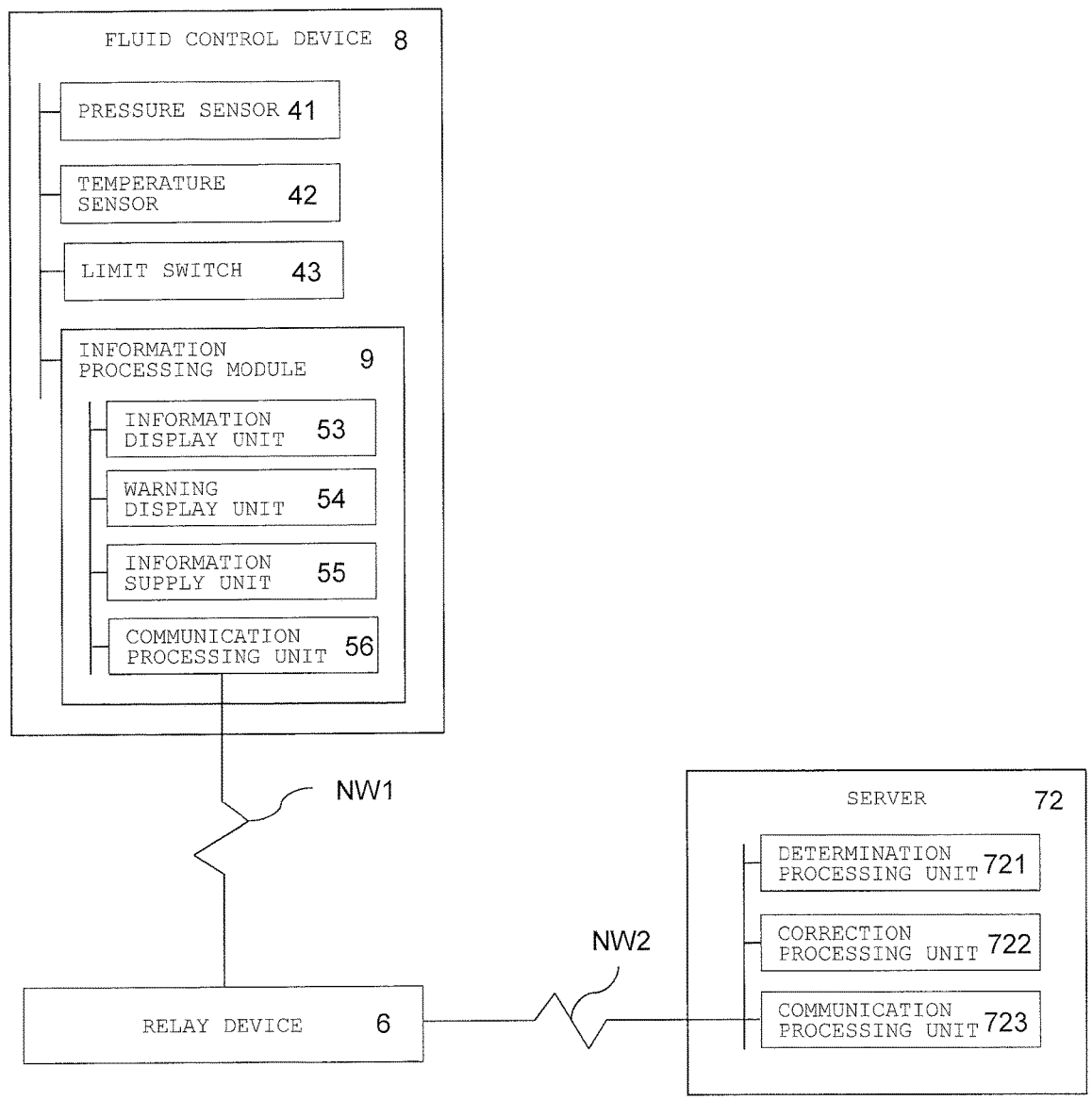
FIG. 13 is a functional block diagram illustrating functions of a fluid control device according to a modification of the present embodiment and a server configured to be able to communicate with the fluid control device.

FIG. 13 illustrates an example in which a fluid control device 8 and a server 72 can communicate with each other through a network.

In the description of this example, the fluid control device 8 has the same structure as the fluid control device 1, and members, functional units, and/or the like denoted with reference numerals (symbols) that are the same as those in the above-described example have or execute the functions that are the same as those of the members, the functional units, and the like unless otherwise stated, and thus the description thereof will be omitted.

In this example, the server 72 includes a determination processing unit 721 and a correction processing unit 722 having the same functions as the determination processing unit 51 and the correction processing unit 52 of the information processing module 5 of the fluid control device 1 described above. Thus, an abnormality of the fluid control device 8 due to the fluid leakage in the space S1 or the like is determined on the side of the server 72.

The fluid control device 8 transmits the data obtained by the pressure sensor 41, the temperature sensor 42, and the limit switch 43 to the server 72, using the communication processing unit 56 of the information processing module 9.

The server 72 includes hardware resources including: a CPU; a computer program executed by the CPU; a RAM and a ROM that stores the computer program and predetermined data; and an external storage device such as a hard disk drive, and provides functional units including the determination processing unit 721, the correction processing unit 722, and a communication processing unit 723.

As in the case of the determination processing unit 51, the determination processing unit 721 executes the processing of determining whether the fluid control device 8 has an abnormality or not due to leakage of the fluid into the space S1 and the like, by comparing a predetermined threshold, held in a reference table or the like, with a detected value of the pressure detected by the pressure sensor 41. Furthermore, when the predetermined threshold value is corrected by the correction processing unit 722, processing of determining an abnormality of the fluid control device 8 is executed based on the corrected threshold value.

As in the case of the correction processing unit 52, the correction processing unit 722 corrects the predetermined threshold, referred to by the determination processing unit 51 to determine whether the fluid has leaked into the space S1, based on the open/close state of the fluid control device 8 detected by the limit switch 43 and/or temperature of the fluid measured by the temperature sensor 42. Note that, in this example, the information related to the open/close state of the fluid control device and the temperature of the fluid measured by the temperature sensor 42 is supplied from the fluid control device 8 to the server 72 through the networks NW1 and NW2.

The communication processing unit 723 receives information related to the open/close state of the fluid control device 8 and the temperature of the fluid measured by the temperature sensor 42 from the fluid control device 8 via the relay device 6.

With the above configuration, the processing of determining the abnormality of the fluid control device 8 is executed on the side of the server 72, so that the information processing module 9 installed in the fluid control device 8 can be simplified and maintenance such as debugging of the program executed by the determination processing unit 721 and/or the correction processing unit 722 can be easily performed.

Furthermore, in the present example, when the processing of determining an abnormality of the fluid control device 8 on the side of the server 72 results in the fluid control device 8 determined to have abnormality, information indicating that the occurrence of the abnormality is transmitted to the fluid control device 8, and the information display unit 53 or the warning display unit 54 of the fluid control device 8 may be caused to display the abnormality or issue a warning.

In the example in which the fluid control device 8 and the server 72 described above are configured to be able to communicate via the networks NW1 and 2, information acquired by the pressure sensor 41, the temperature sensor 42, and the limit switch 43 of the fluid control device 8 can be aggregated. Thus, data mining can be performed based on the aggregated information.

A system for analyzing the operation of the fluid control device 8 will be described as a modification of the above-described embodiment in which the fluid control device 8 and the server 72 are configured to be able to communicate with each other.

Also in this example, the fluid control device 8 includes the pressure sensor 41, the temperature sensor 42, and the limit switch 43 serving as an operation information acquisition mechanism for acquiring operation information about the fluid control device 8. Thus, the fluid control device 8 acquires the operation information about the fluid control device 8 such as the pressure in the space S1, the temperature of the fluid, the number of opening and closing times, and opening/closing frequency of the fluid control device 8 (a plurality of limit switches can be used to detect the opening and closing speed).

On the other hand, in order to analyze the operation of the fluid control device 8, it is also effective to provide a predetermined operation information acquisition mechanism to acquire other types of operation information. Specific examples of such information include the usage period of the fluid control device 8, the temperature and humidity of the external environment of the fluid control device 8, the thrust of the piston 126, the average moving speed and vibration of the piston 126, and the internal stress and the hardness of components of the fluid control device 8.

Figure 14:
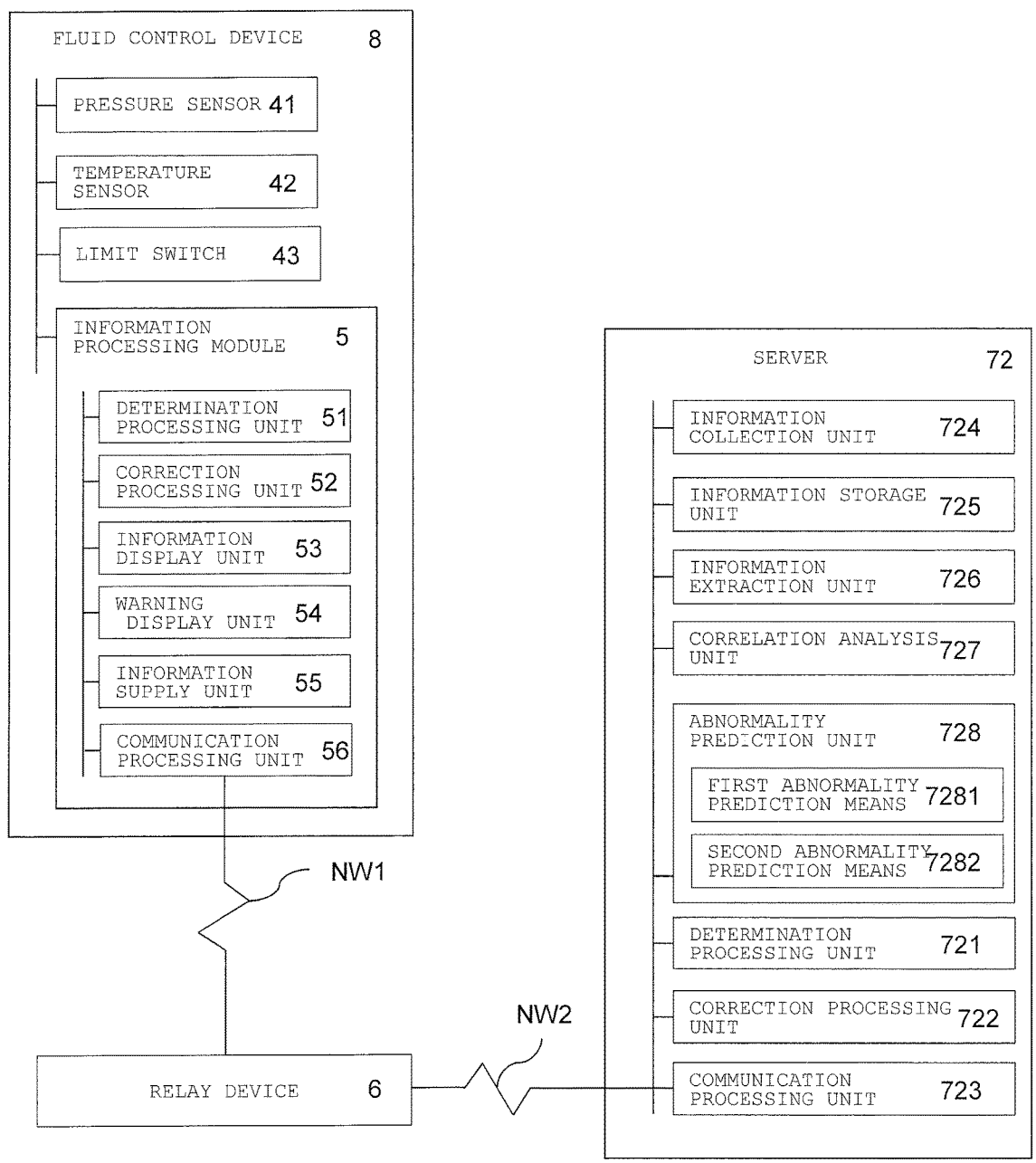
FIG. 14 is a functional block diagram illustrating functions of a fluid control device according to a modification of the present embodiment and a server configured to be able to communicate with the fluid control device.

FIG. 14 illustrates a configuration of the operation analysis system for the fluid control device according to this example.

In this operation analysis system, the server 72 is an information processing apparatus that executes data mining based on the information acquired from the fluid control device 8, and includes an information collection unit 724, an information storage unit 725, an information extraction unit 726, a correlation analysis unit 727, and an abnormality prediction unit 728, as well as the determination processing unit 721, the correction processing unit 722, and the communication processing unit 723 described above.

The information collection unit 724 issues a request for transmitting the operation information to the fluid control device 8, through the communication processing unit 723, to collect the information. The information collection unit 724 issues a request for supplying information related to the abnormality determination result to the fluid control device 8 from the abnormality determination processing unit 721, to collect the information related to the abnormality determination result.

The operation information about the fluid control device 8 may be collected not only from the fluid control device 8 but may also be collected from other devices. For example, the information may be collected from a terminal that measures the temperature and humidity of the location where the fluid control device 8 is installed, or information input by an administrator of the fluid control device 8 using an administrator terminal may be collected.

The information storage unit 725 is a storage unit that stores the operation information collected from the fluid control device 8 and the abnormality determination result obtained by the fluid control device 8.

The information extraction unit 726 refers to the information storage unit 725, and selectively extracts for each of the fluid control device 8, an analysis target including: another operation information with predetermined operation information being the same; and information related to the determination result.

For example, with regard to the operation information of the plurality of fluid control devices 8, information related to the operation time at the same number of valve opening/closing times (e.g., 10 million times) and the abnormality determination result in the corresponding operation time are extracted.

Figure 15:
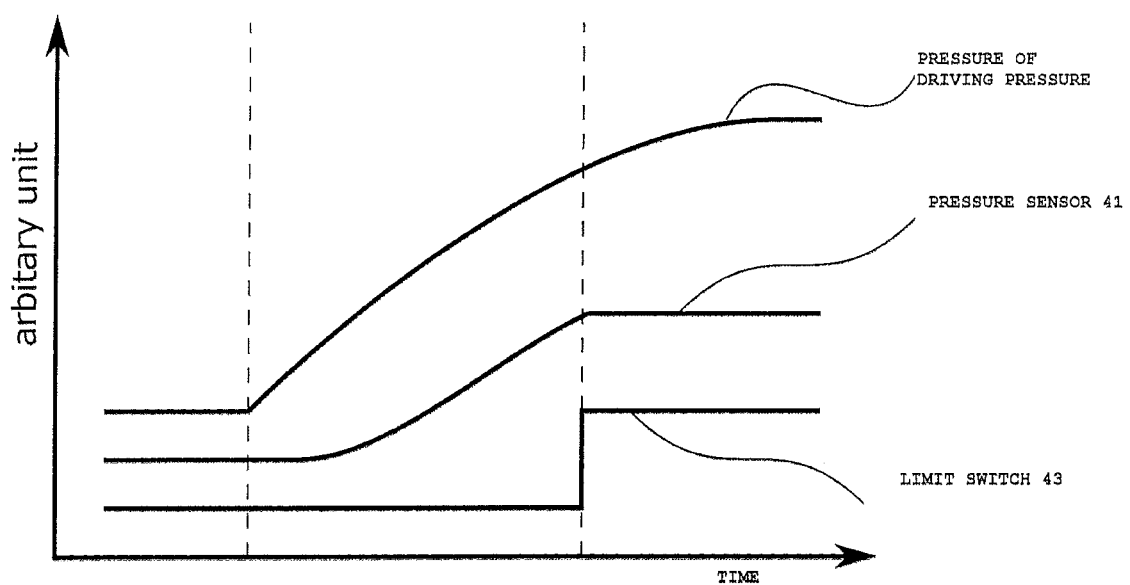
FIG. 15 is a graph illustrating time required for opening/closing the fluid control device.

In particular, from the operation information data about the fluid control device 8, data in a predetermined period of time before and after switching of the open/closed state of the fluid control device 8, detected by a change of the limit switch 43 and/or the pressure sensor 41, is extracted to be input data. This reflects the fact that measuring changes in dynamic sensor measurement values during a valve operation is effective in prediction of abnormality. With the dimensional quantity of input data reduced, a calculation cost for learning described later can be reduced. The predetermined period may be 100 to 500% of the time period required for opening/closing the fluid control device 8 (this time period is defined as a time period between a point when the driving pressure starts to be introduced and a point when the fluid control device 8 is completely open, and this time period corresponds to a time period between two dotted lines in FIG. 15), so that data within a required range can be extracted without waste. Furthermore, by limiting the data transmission from the fluid control device 8 within this time period in advance, the amount of data to be communicated can be reduced so that power consumption of the fluid control device 8 can be reduced.

The correlation analysis unit 727 analyzes the correlation between the predetermined operation of the fluid control device 8 and the occurrence of abnormality, through comparison using the information extracted by the information extraction unit 726.

First learning is performed as supervised learning, based on past operation information about the fluid control device 8 with abnormality, to classify input data into that within a predetermined period before the occurrence of the abnormality (hereinafter, referred to as a failure preceding period), that after the occurrence of the abnormality, and that during a normal operation before the failure preceding period. This learning is performed, for example, through stochastic gradient descent (SGD), using a backpropagation for a model of a neural network, on a model of a neural network.

Learned model determination performance varies depending on a length of the failure preceding period set. Thus, the length of the predetermined period is also a hyper parameter to be adjusted which further includes the number of layers and the number of nodes of the neural network. These hyperparameters is selectively adjusted by, for example, an optimization algorithm, so that a value resulting in higher determination performance can be selected. On the other hand, depending on the application, a valve user may desire to recognize a value in another failure preceding period. In view of this, clustering may be performed with two or more types failure preceding periods prepared. Also, different classifications may be created for respective types of failure, so that which failure would occur can be predicted within a predetermined period.

For example, with the analysis, with regard to the operation information about the plurality of fluid control devices 8, that is, based on an operation time required for opening/closing the valve for 10 million times and the abnormality determination result within the operation period, whether or not the probability of occurrence of abnormality is different between conditions with the number of times the valve is opened and closed being the same (10 million times), that is, between a case where the valve is opened/closed for 10 million times in three months and a case where the valve is opened/closed for 10 million times in three years.

Second learning is performed as unsupervised learning using an auto encoder to detect a special abnormality for which the number of data is limited. The auto encoder performs learning in such a manner that input data during the normal operation of the valve is input to a model formed by the neural network, and the same data is output therefrom. By setting the dimensional quantity of a hidden layer of this neural network to be smaller than the dimensional quantity of the input data and the output data, the auto encoder can learn to appropriately restore the original data only for a pattern of the input data during the normal operation.

Based on the analysis result obtained by the correlation analysis unit 727, the abnormality prediction unit 728 refers to the operation information about the fluid control device 8 stored in the information storage unit 725, and calculates the abnormality occurrence probability of the fluid control device 8 to predict the abnormality of the fluid control device 8.

By causing the learned model obtained by the first learning using the measured values of the current sensor data as input to perform the classification, the probability of the valve being in the failure preceding period can be calculated (first abnormality prediction unit 7281). In other words, this probability is an abnormality occurrence probability indicating a probability that a failure occurs within a predetermined period.

Furthermore, the input data obtained from the current sensor is passed through the auto encoder obtained by the second learning, the output is compared with original input to calculate a discrepancy between the input and the output using L2 norm and the like, and the discrepancy is compared with a predetermined threshold (second abnormality prediction unit 7282). The auto encoder is configured to be capable of restoring the original data as long as data is that input during the normal operation, but cannot correctly restore the original data during the abnormal operation, resulting in a large difference between the input and the output. Thus, an abnormality of the fluid control device 8 can be detected when the difference exceeds the threshold. This scheme can be used in tandem with the above-described supervised learning, so that an abnormal state of a clear outlier not prepared as training data (corresponding to sensor failure, sharp change in operation temperature, and the like for example) can be detected in advance. Thus, the failure preceding period can be more reliably determined. Thus, the problem that how the supervised learning in the first learning behaves in a region with no training data cannot be understood for sure can be dealt with for a certain level. The fluid control device 8 is often placed in an operating environment completely different from the previous one, due to modification of the host apparatus, and thus it can be used as index data indicating whether learning should be performed again.

If an abnormality can be predicted, the administrator terminal or the like used by the administrator of the fluid control device 8 may be notified of such information, or the fluid control device 8 may be notified of the information and the warning display unit 54 may be caused to perform warning display.

In the example described above, the server 72 includes the determination processing unit 721 and the correction processing unit 722. Alternatively, the present invention can be applied to a case where the fluid control device 8 includes the determination processing unit 721 and the correction processing unit 722. In such a case, the information collection unit 724 collects the abnormality determination result from the fluid control device 8.

For example, the analysis by the correlation analysis unit 727 is expected to yield the following analysis results.

(1) Correlation Between the Number of Opening/Closing Times and Occurrence of Abnormality in the Same Use Period of the Fluid Control Device 8

For example, it is expected that the abnormality occurrence probability differs between the case where the valve is opened/closed for 10 million times in three years and the case where the valve is opened/closed for 10 million times in three months.

(2) Correlation Between Environmental Temperature and Occurrence of Abnormality

For example, it is expected that the abnormality occurrence probability differs between use in an environment at 20° C. and use in an environment at 80° C.

(3) Correlation Between Thrust of Piston 126 and Occurrence of Abnormality

For example, it is expected that the load on the diaphragm 113 is affected by a magnitude in the thrust of the piston 126 (depending on a magnitude in the driving pressure).

(4) Correlation Between Opening/Closing Speed of the Fluid Control Device 8 and Occurrence of Abnormality For example, it is expected that the abnormality occurrence probability varies depending on the magnitude of the average moving speed of the piston 126.

(5) Correlation Between Vibration and Occurrence of Abnormality

For example, it is expected that the abnormality occurrence probability varies depending on the magnitude of the environment (vibration).

(6) Correlation Between Distortion of a Component of the Fluid Control Device 8 and Occurrence of Abnormality For example, it is expected that the abnormality occurrence probability varies depending on the magnitude of the internal stress of each member.

(7) Correlation Between Humidity and Occurrence of Abnormality

For example, the abnormality occurrence probability varies depending on the humidity and among members, such as the O rings 1262, 1263, and 24 in particular.

(8) Correlation Between Initial Hardness/Change in Hardness and Occurrence of Abnormality For example, it is expected that the abnormality occurrence probability varies depending on a magnitude of initial hardness of components of the fluid control device 8 at the beginning of use. Further, it is also expected that the abnormality occurrence probability varies depending on a magnitude in the hardness change rate.

Depending on the learning result of the model, for a measurement value of each sensor, a model may be obtained including processing that is similar to predetermined frequency extraction/calculation of correlation between a plurality of pieces of sensor data/matching with a predetermined patter/integration/differentiation/others.

Furthermore, the abnormality determination result of the fluid control device 8 stored in the information storage unit 725 may include information enabling a member (such as a damage on the diaphragm 113, a damage on the O ring 1262, 1263, and 24, or a member in the actuator body such as the piston 126) that has been damaged and results in the abnormality to be recognized. Thus, a member that is likely to be affected by a change in the valve opening/closing speed, a change in a flowrate, and piston movement failure, and the like can be recognized.

In addition to predicting the occurrence of an abnormality by the above data mining, the prediction information may be compared with an actual occurrence of the abnormality to analyze the correlation, to enhance the accuracy of the correlation analysis.

REFERENCE SIGNS LIST

Figure 8:
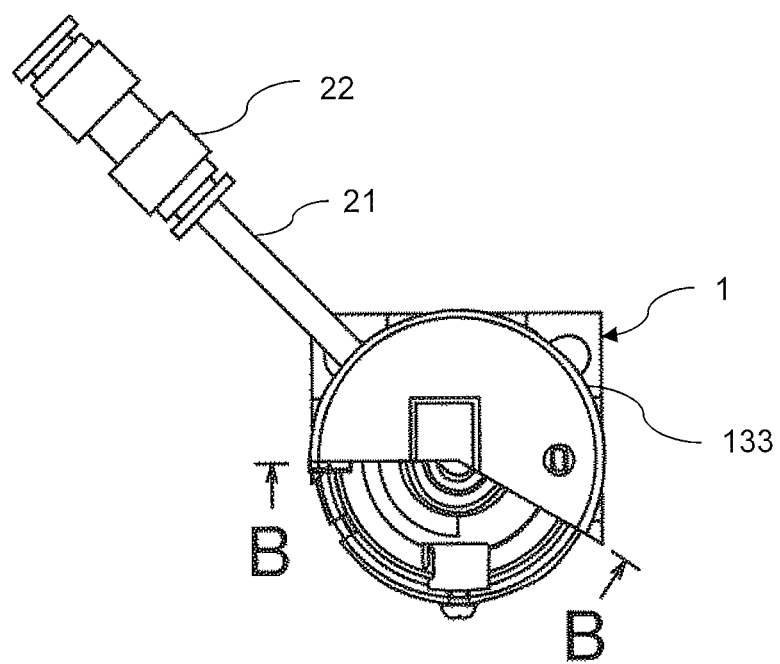
FIG. 8 is a partially transparent view of the fluid control device according to the present embodiment.
Figure 9:
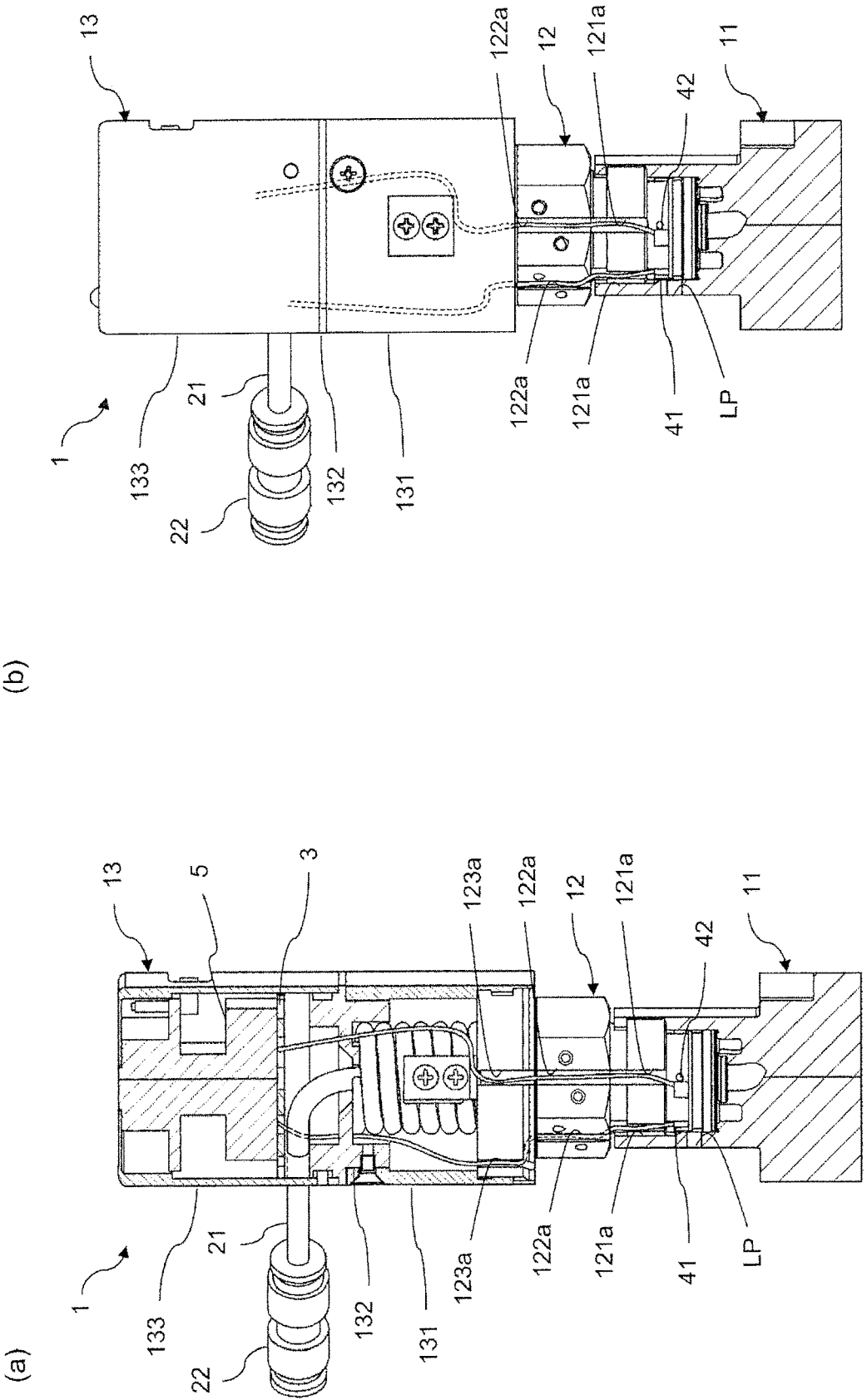
FIG. 9 is a diagram illustrating a wiring path of the fluid control device according to the present embodiment taken along a line indicated by arrows B-B, and includes (a) that is a transparent view of a valve body and a casing, and (b) that is a transparent view of the valve body.

Fluid control device
Valve body
111 Flow path
112 Seat
113 Diaphragm
LP Leak port
S1 Space
Actuator body
121 Screw portion
122 Exposed portion
1221 Cover
123 Screw portion
124 Disk
125 Pressing adapter
126 Piston
127 Spring
13 Casing
131 Cap body
132 Actuator cap
1321 Fixing member
133 Cap top
21 Introduction pipe
22 One-touch fitting
23 Fixing member
24 O ring
3 Holding member
31 Protrusion
3a Through hole
3b Through hole
41 Pressure sensor
42 Temperature sensor
43 Limit switch
NW1, NW2 Network
FIG. 11
1 FLUID CONTROL DEVICE
5 INFORMATION PROCESSING MODULE
41 PRESSURE SENSOR
42 TEMPERATURE SENSOR
43 LIMIT SWITCH
51 DETERMINATION PROCESSING UNIT
52 CORRECTION PROCESSING UNIT
53 INFORMATION DISPLAY UNIT
54 WARNING DISPLAY UNIT
55 INFORMATION SUPPLY UNIT
FIG. 12
1 FLUID CONTROL DEVICE
5 INFORMATION PROCESSING MODULE
6 RELAY DEVICE
41 PRESSURE SENSOR
42 TEMPERATURE SENSOR
43 LIMIT SWITCH
51 DETERMINATION PROCESSING UNIT
52 CORRECTION PROCESSING UNIT
53 INFORMATION DISPLAY UNIT
54 WARNING DISPLAY UNIT
55 INFORMATION SUPPLY UNIT
56 COMMUNICATION PROCESSING UNIT
71 SERVER
711 COMMUNICATION PROCESSING UNIT
FIG. 13
8 FLUID CONTROL DEVICE
9 INFORMATION PROCESSING MODULE
6 RELAY DEVICE
41 PRESSURE SENSOR
42 TEMPERATURE SENSOR
43 LIMIT SWITCH
53 INFORMATION DISPLAY UNIT
54 WARNING DISPLAY UNIT
55 INFORMATION SUPPLY UNIT
56 COMMUNICATION PROCESSING UNIT
72 SERVER
721 DETERMINATION PROCESSING UNIT 722 CORRECTION PROCESSING UNIT
723 COMMUNICATION PROCESSING UNIT
FIG. 14
5 INFORMATION PROCESSING MODULE
8 FLUID CONTROL DEVICE
6 RELAY DEVICE
41 PRESSURE SENSOR
42 TEMPERATURE SENSOR
43 LIMIT SWITCH
51 DETERMINATION PROCESSING UNIT
52 CORRECTION PROCESSING UNIT
53 INFORMATION DISPLAY UNIT
54 WARNING DISPLAY UNIT
55 INFORMATION SUPPLY UNIT
56 COMMUNICATION PROCESSING UNIT
72 SERVER
721 DETERMINATION PROCESSING UNIT
722 CORRECTION PROCESSING UNIT
723 COMMUNICATION PROCESSING UNIT
724 INFORMATION COLLECTION UNIT
725 INFORMATION STORAGE UNIT
726 INFORMATION EXTRACTION UNIT
727 CORRELATION ANALYSIS UNIT
728 ABNORMALITY PREDICTION UNIT

The invention claimed is:

1. An operation analysis system for a fluid control device, wherein
the system analyzes operations of the fluid control device by executing data mining based on information acquired from the fluid control device,
the system comprising:
an information collection unit that collects the operation information of the fluid control device and a determination result of an abnormality of the fluid control device,
an information storage unit that stores the operation information and the determination result collected,
an information extraction unit that refers to the information storage unit, and extracts an analysis target including same predetermined operation information and another of the operation information as well as information related to the determination result, selectively for each of a plurality of the fluid control devices,
a correlation analysis unit that analyzes correlation between a predetermined operation of the fluid control device and occurrence of abnormality through comparison using the information extracted, and
an abnormality prediction unit that, based on an analysis result obtained by the correlation analysis unit, refers to the operation information about the fluid control device stored in the information storage unit, and calculates an abnormality occurrence probability of the fluid control device, to predict occurrence of abnormality of the fluid control device,
wherein the information extracted is the operation information within a predetermined period of time before and after an open/close state of the fluid control device is switched and information related to the determination result.

2. The operation analysis system for a fluid control device according to claim 1, wherein
the fluid control device is provided with a flow path and a space isolated from the flow path by an isolation member,
the fluid control device includes a pressure sensor that detects pressure in the space isolated from the flow path by the isolation member, the pressure sensor serving as the operation information acquisition mechanism, and
the abnormality determination unit compares a detected value detected by the pressure sensor with a predetermined threshold, to determine whether the fluid control device has an abnormality.

3. The operation analysis system for a fluid control device according to claim 1, wherein
the operation information acquisition mechanism acquires, as operation information, all of or any two or more of number of opening/closing times, operation time, environment temperature, environment humidity, and driving pressure of the fluid control device, as well as internal stress acting on a component of the fluid control device.

4. The operation analysis system for a fluid control device according to claim 1, wherein
the abnormality prediction unit includes
a first abnormality prediction unit that determines whether the operation information includes a specific characteristic in a failure preceding period, by means of supervised learning, and
a second abnormality prediction unit that determines whether the operation information indicates a normal operation state, by means of an autoencoder that has learned the operation information during a normal operation.

5. An operation analysis system for a fluid control device, wherein
the fluid control device and a server that executes data mining based on information acquired from the fluid control device are configured to be able to communicate with each other through a network,
the fluid control device includes
an operation information acquisition mechanism that acquires a plurality of types of operation information about the fluid control device, and
an abnormality determination unit that determines whether the fluid control device has an abnormality, and
the server includes
an information collection unit that collects the operation information and an abnormality determination result for the fluid control device,
an information storage unit that stores the operation information and the determination result collected,
an information extraction unit that refers to the information storage unit, and extracts an analysis target including same predetermined operation information and another of the operation information as well as information related to the determination result, selectively for each of a plurality of the fluid control devices,
a correlation analysis unit that analyzes correlation between a predetermined operation of the fluid control device and occurrence of abnormality through comparison using the information extracted, and
an abnormality prediction unit that, based on an analysis result obtained by the correlation analysis unit, refers to the operation information about the fluid control device stored in the information storage unit, and calculates an abnormality occurrence probability of the fluid control device, to predict occurrence of abnormality of the fluid control device,
wherein the information extracted is the operation information within a predetermined period of time before and after an open/close state of the fluid control device is switched and information related to the determination result.

6. An operation analysis method for a fluid control device, wherein
the method analyzes operations of the fluid control device by executing data mining based on information acquired from the fluid control device,
the method comprising:
a process of determining whether the fluid control device has an abnormality,
a process of collecting the operation information and an abnormality determination result for the fluid control device,
a process of storing the operation information and the determination result collected in an information storage unit,
a process of referring to the information storage unit, and extracting an analysis target including same predetermined operation information and another of the operation information as well as information related to the determination result, selectively for each of a plurality of the fluid control devices, and
an analyzing process of analyzing correlation between a predetermined operation of the fluid control device and occurrence of abnormality through comparison using the information extracted,
a process, based on a result of the analyzing process, of referring to the operation information about the fluid control device stored in the information storage unit, and calculating an abnormality occurrence probability of the fluid control device, to predict occurrence of abnormality of the fluid control device,
wherein the information extracted is the operation information within a predetermined period of time before and after an open/close state of the fluid control device is switched and information related to the determination result.

7. A non-transitory computer program for operation analysis for a fluid control device, wherein
the program analyzes operations of the fluid control device by executing data mining based on information acquired from the fluid control device
the non-transitory computer program causes a computer to execute
a process of determining whether the fluid control device has an abnormality,
a process of collecting the operation information and an abnormality determination result the fluid control device,
a process of storing the operation information and the determination result collected in an information storage unit,
a process of referring to the information storage unit, and extracting an analysis target including same predetermined operation information and another of the operation information as well as information related to the determination result, selectively for each of a plurality of the fluid control devices, and
an analyzing process of analyzing correlation between a predetermined operation of the fluid control device and occurrence of abnormality through comparison using the information extracted,
a process, based on a result of the analyzing process, of referring to the operation information about the fluid control device stored in the information storage unit, and calculating an abnormality occurrence probability of the fluid control device, to predict occurrence of abnormality of the fluid control device,
wherein the information extracted is the operation information within a predetermined period of time before and after an open/close state of the fluid control device is switched and information related to the determination result.

* * * * *